(12) United States Patent
Fuchs et al.

(10) Patent No.: US 11,244,561 B1
(45) Date of Patent: Feb. 8, 2022

(54) SYSTEMS AND METHODS FOR NETWORK CONFIGURATION AND COMMUNICATIONS FOR REMOTE DEVICE CONTROL

(71) Applicant: Arkade, Inc., Centennial, CO (US)

(72) Inventors: Joshua Allan Fuchs, Granada Hills, CA (US); Bob Steven Berns, Hidden Hills, CA (US); Joel Abraham Kort, Van Nuys, CA (US)

(73) Assignee: Arkade, Inc., Centennial, CO (US)

( * ) Notice: Subject to any disclaimer, the term of this patent is extended or adjusted under 35 U.S.C. 154(b) by 0 days.

(21) Appl. No.: 17/383,094

(22) Filed: Jul. 22, 2021

(51) Int. Cl.
G08C 17/02 (2006.01)
H04L 12/24 (2006.01)
H04W 4/80 (2018.01)

(52) U.S. Cl.
CPC ............. *G08C 17/02* (2013.01); *H04L 41/12* (2013.01); *G08C 2201/20* (2013.01); *G08C 2201/30* (2013.01); *H04W 4/80* (2018.02)

(58) Field of Classification Search
CPC ........................... G08C 17/02; G08C 2201/20; G08C 2201/30; H04L 41/12; H04L 41/04; H04L 41/085; H04L 45/02; H04W 4/80; H04W 84/18
See application file for complete search history.

(56) References Cited

U.S. PATENT DOCUMENTS

2014/0007192 A1* 1/2014 Qureshi ................. G06F 21/53
726/3

OTHER PUBLICATIONS

Balan, Rajesh Krishna, et al. "Tactics-based remote execution for mobile computing." Proceedings of the 1st international conference on Mobile systems, applications and services. 2003. (Year: 2003).*
Dey, Shopan, Ayon Roy, and Sandip Das. "Home automation using Internet of Thing." 2016 IEEE 7th Annual Ubiquitous Computing, Electronics & Mobile Communication Conference (UEMCON). IEEE, 2016. (Year: 2016).*

* cited by examiner

*Primary Examiner* — Sharad Rampuria
(74) *Attorney, Agent, or Firm* — Foley & Lardner LLP

(57) ABSTRACT

In some aspects, the disclosure is directed to methods and systems for easy and intuitive control over network configurations and security for transient or guest devices, and remote control of additional devices, either directly in some implementations, or indirectly via a hosted interface by a control device in other implementations, eliminating the need for pairing or otherwise establishing communications between the guest devices and the additional devices. This may improve network security overall and particularly encourage segregation of untrusted devices, while still providing enhanced functionality and control over other network devices in a secure manner.

20 Claims, 12 Drawing Sheets

| VLAN/subnet | Devices | Deny | Permit |
|---|---|---|---|
| 1 | Control device | - | Any |
| 2 | Authorized user devices | - | Any |
| 3 | Manufacturer A devices | 2, 4, 5, etc. | Any |
| 4 | Manufacturer B devices | 3, 5, etc. | Any |
| 5 | Guest device A | 2, 3, 6, etc. | 4 |
| 6 | Guest device B | 2, 3, 4, 5, etc. | Any |

SYSTEMS AND METHODS FOR NETWORK CONFIGURATION AND COMMUNICATIONS FOR REMOTE DEVICE CONTROL

FIELD OF THE DISCLOSURE

This disclosure generally relates to systems and methods for communications. In particular, this disclosure relates to systems and methods for automatic network configuration and communication for remote control of devices.

BACKGROUND OF THE DISCLOSURE

Network configuration for security is frequently complicated, particularly with environments in which different devices have different communications and security requirements. Furthermore, with modern home automation systems and Internet-of-Things (IoT) devices, home networking environments in particular are growing in complexity and proper security configuration may be beyond the skills of many typical users. For example, users may have home computers, including desktop or laptop computers, media consumption devices such as tablet computers, video game consoles, set top boxes, security cameras, and a host of "smart" devices, including smart televisions, smart speakers, smart refrigerators, smart thermostats, smart cooking appliances such as immersion circulators or remote thermometers, smart lights, etc., and such devices may be configured to communicate via wired mediums and protocols such as Ethernet and/or wireless mediums and protocols such as IEEE 802.11 (WiFi) or 802.15 and its successors (Bluetooth), or other such communications mediums and protocols. Such devices may have very different communication needs—such as communicating with external servers via the Internet, communicating with other devices on the network, etc.—and may have different security best practices—such as preventing communication with external servers or devices over the Internet, preventing communications with other devices on the network, etc. For example, a smart thermostat may communicate with a web server for monitoring and remote control over the Internet, but likely shouldn't be communicating directly with a television or refrigerator. However, due to the high complexity, typically low user skill, and lack of intuitive tools, very few networks and devices are properly configured to follow security best practices. For example, many home networks are configured without any logical divisions, with every device on the network able to communicate with every other device and having unrestricted Internet access.

This problem is compounded with transient devices, or those that are only members of a network for a limited time, sometimes referred to as guest clients or guest devices. Even users that properly configure their networks and devices may fail to reconfigure the network when a new guest device is present. For example, when hosting a party, visitors to a residence may wish to access the residence's WiFi network. Rather than manually reconfiguring the network and each additional device, typical users may allow free network access to the guest devices (e.g. providing a WiFi password but without additional per-device security settings). As a result, malicious users and/or compromised devices may have unfettered access to other devices on the network.

Additionally, in some implementations, simply placing guest devices into a demilitarized zone (DMZ) network (e.g. by setting up a second WiFi network with Internet access, but no access to other network devices) may be inadequate for some uses. For example, some devices or appliances may allow for control from a user's mobile device, e.g. as a game controller, remote control, etc. Accordingly, such uses may require communications between guest devices and other network devices, and completely segregating guest devices may not meet user requirements.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

Figure 1A:
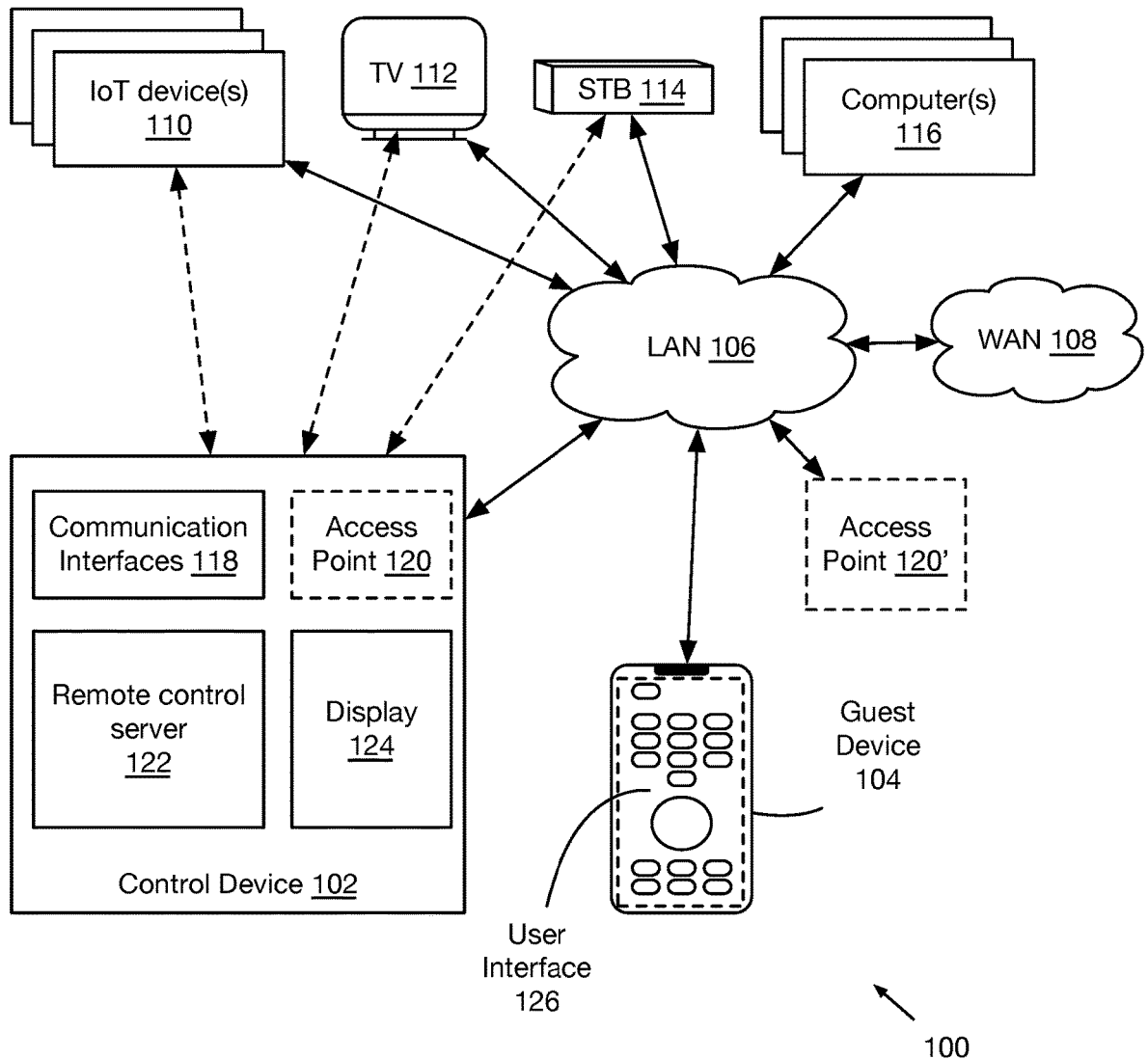
FIG. 1A is a block diagram depicting an embodiment of a remote control network architecture.

The details of various embodiments of the methods and systems are set forth in the accompanying drawings and the description below.

DETAILED DESCRIPTION

For purposes of reading the description of the various embodiments below, the following descriptions of the sections of the specification and their respective contents may be helpful:

Section A describes embodiments of systems and methods for network configuration and communications for remote control; and
  Section B describes a network environment and computing environment which may be useful for practicing embodiments described herein.

A. Systems and Methods for Network Configuration and Communications for Remote Control Network configuration for security is frequently complicated, particularly with environments in which different devices have different communications and security requirements, such as desktop or laptop computers, media consumption devices, video game consoles, set top boxes, security cameras, and "smart" devices, including smart televisions, smart speakers, smart refrigerators, smart thermostats, smart cooking appliances such as immersion circulators or remote thermometers, smart lights, etc., sometimes referred to as IoT devices. Such devices may be configured to communicate via wired mediums and protocols such as Ethernet and/or wireless mediums and protocols such as IEEE 802.11 (WiFi) or 802.15 and its successors (Bluetooth), or other such communications mediums and protocols. These devices may have very different communication needs—such as communicating with external servers via the Internet, communicating with other devices on the network, etc.—and may have different security best practices—such as preventing communication with external servers or devices over the Internet, preventing communications with other devices on the network, etc. Furthermore, transient devices, or those that are only members of a network for a limited time and sometimes referred to as guest clients or guest devices, may be added to the network for short time periods, such as a few hours or less, and many users don't bother with setting proper security configurations for such short uses. As a result, malicious users and/or compromised devices, including those of visitors to a location, may have unfettered access to other devices on the network.

However, simply placing guest devices into a demilitarized zone (DMZ) network may be inadequate for some uses and impair or prevent desired functionality. For example, some devices or appliances may allow for control from a user's mobile device, e.g. as a game controller, remote control, etc. In some implementations, such remote control functionality may replace traditional device-specific remote controls. For example, a user's smart phone may be utilized as a remote control for a smart television or set top box. However, this typically requires that the phone and television or set top box be connected to the same network (or a dedicated communication channel may need to be established, such as via Bluetooth). Accordingly, such uses may require communications between guest devices and other network devices, and completely segregating guest devices may not meet user requirements.

Implementations of the systems and methods discussed herein provide for easy, intuitive, and automatic or near-automatic configuration of network communications and security capabilities for IoT and guest devices, and in some implementations, automatic provisioning of remote control capabilities for devices. A new device may be identified and added to a network, such as a mobile device of a visitor or guest, and placed in a separate logical subnetwork or dynamic virtual local area network (VLAN). Routing permissions may be set for the new device to allow it to access a specified device or devices while restricting or preventing access to other devices.

For devices that utilize remote controls, in some implementations, a remote control interface may be provided to a guest device, e.g. as an interactive web page or other interface hosted by a control device. The control device may act as an intermediary to provide remote control functionality to other network devices at the request of the guest device. This may allow for such functionality without needing direct communications between the guest device and other network device, increasing security, and may also provide for control via different protocols and mediums without requiring extensive reconfiguration of the guest device. For example, in one such implementation, a guest device may connect to a network via WiFi and be provided with a user interface hosted by a control device in communication with a smart television via Bluetooth, such as via a captive portal providing a web page upon request to a predetermined uniform resource locator (URL) by the guest device. The web page may include one or more interactive elements (e.g. buttons, sliders, etc.) corresponding to commands for the smart television, such as channel assignments, volume controls, etc. Selection by a user of the guest device of an interactive element may trigger the guest device to transmit a request to the control device (e.g. via a representational state transfer (RESTful) request such as an HTTP GET or POST request comprising a parameter-value pair, via an application programming interface (API) or remote procedure call (RPC), etc.). The control device may receive the request and in response transmit a corresponding command to the smart television (e.g. via a Bluetooth interface). In some implementations, advanced commands such as gestures and pointing commands via an inertial measurement unit (IU) or other sensor of the guest device may be provided in the same method. Accordingly, the guest device need not be paired with the smart television, and access may be provided by the control device. In a similar implementation, control of other devices may be provided to the guest device via the web page (e.g. control over smart lights, speakers, or other environmental controls). Additionally, some controls of other devices may not be provided to the guest device, such as configuration controls. This may allow the guest device to utilize, but not change, established configurations, even if those configuration controls would be exposed to any device with direct access (e.g. via a standard remote control with a setup or configuration button, via a mobile application with settings available, etc.).

For example, referring first to FIG. 1A, illustrated is s a block diagram depicting an embodiment of a remote control network architecture 100. In brief overview, a control device 102 may provide configuration and control information to a guest device 104 for access to a network (e.g. a local area network (LAN) 106 and/or a wide area network (WAN) 108 such as the Internet) and access to one or more network devices, such as IoT devices 110, televisions 112, set top boxes or media devices 114, computers 116, or any other type and form of devices (e.g. printers, home automation systems, smart lighting, cameras, etc.).

Still referring to FIG. 1A and in more detail, in some implementations, the control device 102 may comprise a wireless access point 120, while in other implementations, the control device 102 may communicate with a wireless access point 120'. For example, in some implementations, control device 102 may comprise a network appliance such as a wireless access point, broadband modem, cable modem, network switch, or other such network device. By incorporating the features discussed herein in such a network device, implementations of these systems may provide a turnkey, single-device solution. In other implementations, the control device 102 may comprise a separate computing device such as a laptop computing device, tablet computing device, smartphone, desktop computing device, intelligent remote control, or other such computing device and may communicate with an access point 120' as an administrator (e.g. via an API or RPC protocol of the access point, by uploading configuration settings or firmware to the access point, etc.).

Control device 102 may comprise one or more communication interfaces 118, which may be of different types and for different communications mediums. For example, in some implementations, control device 102 may comprise wired interfaces such as 10BaseT, 100BaseT, 1000BaseT, or any other speed or version of Ethernet, coaxial broadband (e.g. interfaces using a Multimedia over Coaxial Alliance (MoCA) standard or similar interfaces), etc.; wireless interfaces such as WiFi, Bluetooth, Zigbee, MiWi, Near Field Communications (NFC), etc.; and/or optical interfaces such as infrared transceivers for communication with audio/visual receivers, televisions, etc. including legacy devices that lack other communication interfaces for remote controls. For example, control device 102 may comprise an infrared remote control transceiver and/or a Bluetooth transceiver, and may include a WiFi access point (or communicate with a WiFi access point for control over other network devices).

As discussed above, in some implementations, control device 102 may comprise an access point 120. For example, in such implementations, control device 102 may be referred to as an access point, a WiFi gateway, a smart access point, or by similar terms, and may provide wireless connectivity to other devices including guest devices 104 and/or IoT devices 110, televisions 112, set top boxes, 114, computers 116, and/or any other type and form of computing device. For example, referring briefly ahead to FIG. 1F, illustrated is an example implementation of a control device 102 in a desktop or appliance form-factor, incorporating a touch screen or display 124 for configuration of network devices and remote control functionality. In other implementations, other form-factors may be utilized. For example, in some implementations, control device 102 may have a shape and size similar to a conventional television remote control. In some such implementations, control device 102 may comprise a display 124 and, when not being used for configuration of network devices, may present a user interface for remote control of devices directly from the control device 102 (e.g. as a universal remote control, smart remote control, or similar devices). Accordingly, in addition to providing network services and/or configurations, control device 102 may itself be used for remote control in some implementations. Returning to FIG. 1A, in other implementations, an external access point 120' may provide wireless network connectivity to other devices 104, 110-116, as well as to a control device 102, which may act as a network client device. In such implementations, the control device 102 may have administrator access to the access point 120 (e.g. be able to interact with configurations or settings of the access point 120 via an API, RPC, administration application, or other such method).

In some implementations, a control device 102 may comprise a remote control server 122. Remote control server 122 may comprise a web server, application server, or similar server, and may comprise an application, service, server, daemon, routine, or other executable logic for transmitting data, such as web pages, to remote devices, such as guest device 104. Web pages or other executable code provided by remote control server 122 may comprise configuration pages or user interfaces, and/or remote control interfaces 126 for different devices 110-116. For example, in one such implementation, remote control server 122 may provide a device-specific remote control user interface 126 of a television 122 or other device, including channel and volume buttons, directional buttons for menu navigation, etc., which may be received by and rendered by a guest device 104 as shown in FIG. 1A.

For example, in some implementations, guest device 104 may retrieve or receive a web page from remote control server 122 comprising executable code (e.g. HTML, Javascript, or other such code) that may be rendered by application of guest device 104 to display a user interface 126 for a device 110-116 to be controlled. Each of the buttons or other interface elements of interface 126 may be associated with a corresponding control command for the corresponding device. For example, an "up" button in the user interface provided by remote control server 122 may be associated with an "up" command to be transmitted via Bluetooth to a paired television. In some such implementations, the button may comprise a hyperlink, and selection of the button may cause the application of guest device 104 to transmit a request comprising an API command or RESTful command to the control device 102 (e.g. an HTTP POST or GET request comprising an address or URL of the remote control server 122 or the hosted web page associated with the target device, and/or parameters to identify the command and/or target device, such as an identifier of a television 112 and a parameter-value pair of "command=up", or similar data). Responsive to receipt of the request, the remote control server 122 may initiate transmission of the corresponding command (e.g. an "up" command via Bluetooth to a paired television 112). As noted above, such implementations allow a guest device 104 to control Bluetooth devices without pairing (and/or control other devices via the LAN 106, with the control device 102 as an intermediary to provide security). Control device 102 may provide different web pages to different guest devices 104 for simultaneous control of different devices 110-116, in some implementations. In some implementations, control device 102 may provide a user interface 126 with only a subset of controls to a guest device 104 (e.g. channel or volume changing buttons, but not setup or configuration buttons). As discussed above, in some implementations, control device 102 may act as a remote control independently, and may comprise a display 124 for rendering, via a web browser or other application of control device 102, a similar user interface 126 (e.g. a local web page comprising command buttons for various devices).

In some implementations, a user of guest device 104 may manually select to join network 106 (e.g. by selecting an SSID broadcast by access point 120 or 120' or entering a hidden SSID via a user interface). However, manually entering an SSID and/or passcode may be complex or frustrating, and accordingly, many users reduce security (e.g. using shorter passcodes, etc.). Instead, a visual code may be displayed via display 124 of a control device 102 and/or access point 120', such as a quick response (QR) matrix code, barcode, or other such code. For example, the WiFi Easy Connect standard promulgated by the WiFi Alliance specifies an SSID, encryption type, password or passphrase, and if the SSID is hidden or not. Capturing the displayed code via a camera of a mobile device configured to interpret such visual codes may trigger the device to join the identified wireless network. This may reduce the amount of required user interaction to utilize the system, and encourage users to apply higher level security settings as no additional effort is required.

Figure 1B:
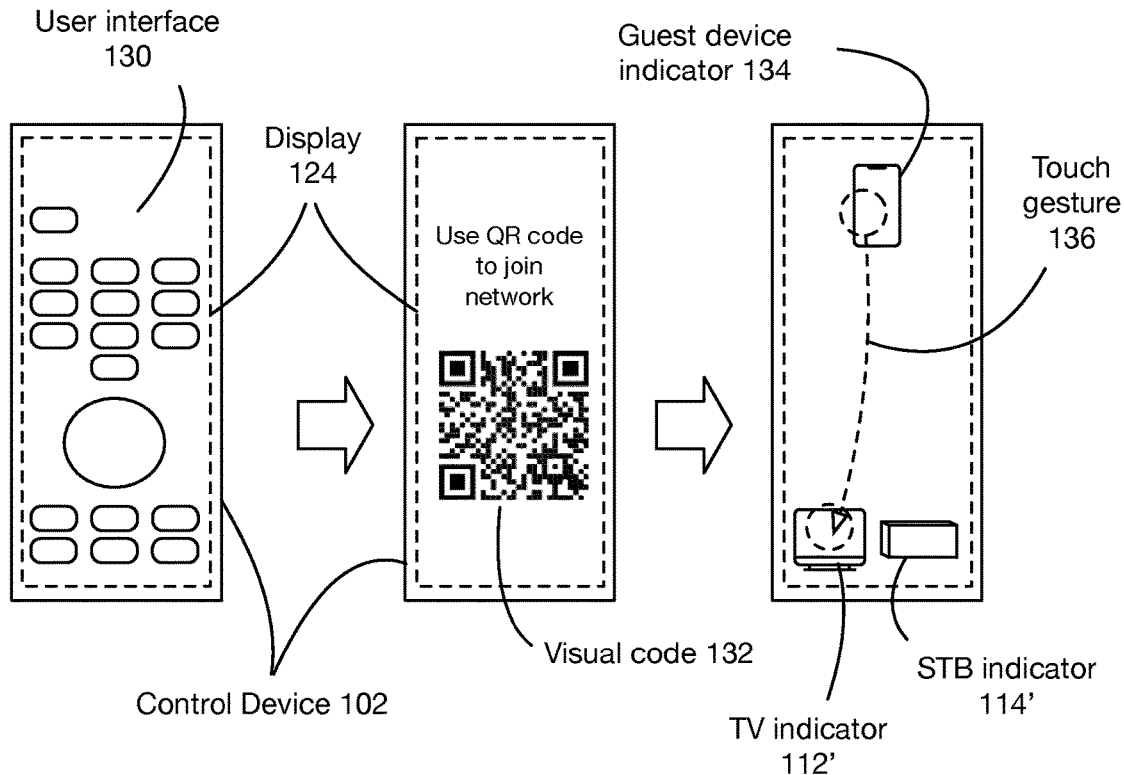
FIG. 1B is an illustration depicting a sequence of user interface steps to configure network communications and remote control, according to some implementations.

FIG. 1B is an illustration depicting a sequence of user interface steps to configure network communications and remote control, according to some implementations. As shown at left, a control device 102 may display a user interface 130 via a display device 124, which may comprise a control interface for the device 102 and/or for other devices (e.g. IoT devices 110, television 112, set top boxes 114, computers 116, and/or any other type and form of device). For example, when control device 102 comprises a universal remote control or is used as such, the control device 102 may display the user interface in typical operation. In some implementations such as the implementation illustrated in FIG. 1B, the control device 102 may include a display 124, which may comprise a capacitive or resistive touchscreen, including an LED or OLED display or other such display technology. For example, in some implementations, display 124 may comprise a low power electrophoretic ink (eInk) display. In some implementations, display 124 may be on another device, such as a smart television or mobile device of a user. For example, a device connected to network 106 other than a guest device 104 (e.g. a computer 116, television 112, IoT device 110, another smart phone or tablet computer, etc.) may utilize an application or web browser to display a webpage including a user interface provided by remote control server 122 as discussed above. This may allow for implementations in which control device 102 does not itself include a display 124.

In some implementations, responsive to a user selecting a button or control of the user interface 130 or another such trigger, the control device 102 may display a visual code 132 encoding a configuration of the network (e.g. SSID, encryption type, and passcode or pass phrase, as discussed above) as shown in the middle of FIG. 1B. Although shown as a QR code, in other implementations, different code types may be utilized (e.g. barcodes, alphanumeric strings that may be captured and recognized via an optical character recognition algorithm, etc.). The code may be captured by a guest device 104 to join the network.

Security policies may also be applied in an easy and intuitive manner before, during, or after connection of the guest device 104 to the network. As shown at the right of FIG. 1B, a security configuration user interface may display indicators or identifiers of the guest device 134, as well as indicators of one or more network devices including TV indicator 112' and STB indicator 114' (as well as home automation systems, cameras, smart lights, speakers, printers, computers, or other IoT devices). An administrator or user of control device 102 may use a gesture to drag between the guest device indicator 134 and a desired device indicator (e.g. touch gesture 136 to TV indicator 112' as shown) to enable a control policy in which the guest device 134 is able to communicate with and/or control the selected other device. Rather than allowing access to all devices on the network, individual devices may be selected and communications allowed only between the guest device and the selected individual devices. Although only one gesture is shown, in many implementations, multiple control connections may be enabled. In some implementations, a default control connection may be set (e.g. always allowing guest devices to control a television, lights, or other common items).

Figure 1C:
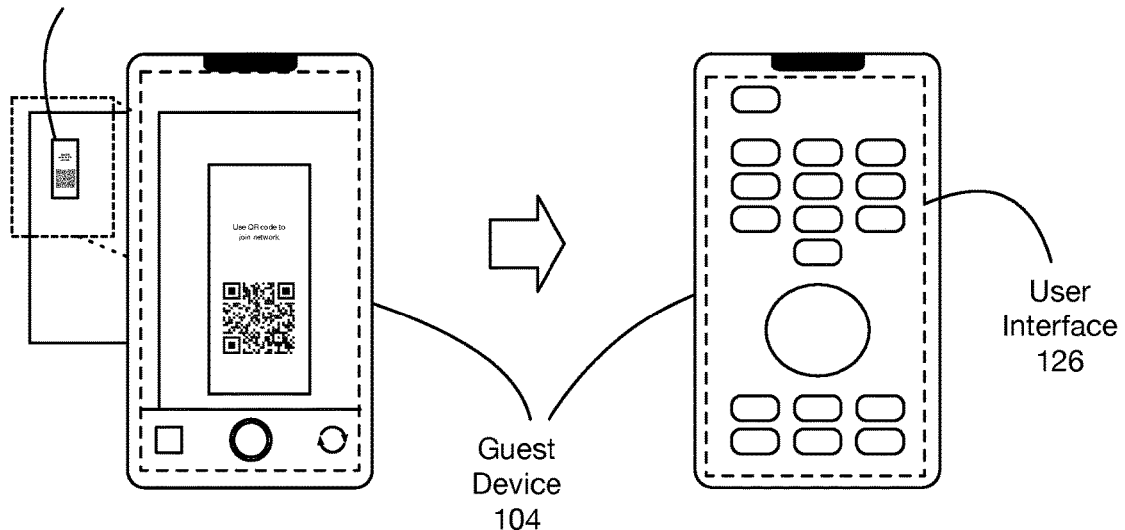
FIG. 1C is an illustration depicting user interfaces displayed by a guest device, according to some implementations.

FIG. 1C is an illustration depicting user interfaces displayed by a guest device 104 during connection to a network, according to some implementations. As shown at left, a guest device 104 may capture an image of a control device 102 displaying a visual code 132. The guest device may extract network configuration identifiers from the visual code and use the configuration identifiers to join the network, as discussed above. If a device is selected for control (as shown at right in FIG. 1), then at FIG. 1C, the guest device 104 may retrieve and render code of a user interface 126 (e.g. from a remote control server 122 as discussed above). This retrieval may be done automatically upon joining the network, in many implementations. For example, in some implementations, upon joining the network, guest device 104 may broadcast an identifier via the network informing other devices that it is present. The control device 102 may receive the broadcast, determine that the guest device 104 has newly joined the network, and provide a push notification with a URL of a remote control user interface web page to be accessed by a browser of guest device 104. In another implementation, upon joining the network, guest device 104 may attempt to access a predetermined URL (e.g. typically a network address on the Internet). The wireless access point 120 of the control device 102 (or wireless access point 120') may intercept and/or redirect the request to an address of the remote control server 122 of the control device. This may be done in a similar manner to captive portals on public WiFi access points that are typically used to present a landing page or authentication page prior to providing full Internet access, e.g. via HTTP redirects to the captive portal address, via ICMP redirects, and/or via DNS redirects (e.g. providing the IP address of the remote control server 122 rather than the external IP address of the requested domain). Rather than an authentication page, the captive portal page may comprise the remote control user interface 126 for the designated device. Accordingly, via the steps illustrated in FIGS. 1B and 1C, a guest user may capture a visual indicator of a network configuration with their mobile device, and automatically join the network and be provided with a remote control interface for one or more network devices without requiring additional user interaction.

As discussed above, the captive portal need not provide control of every network device, and the guest device may be prevented from communicating with network devices other than those for which control has been enabled. In various implementations, selection of devices to be controlled may be performed prior to displaying the visual code to the guest device and/or after displaying the code (e.g. after the device has joined the network, and/or retrieved a control user interface, which may be dynamically updated or refreshed in response to user selection of other devices to be controlled.

Figure 1D:
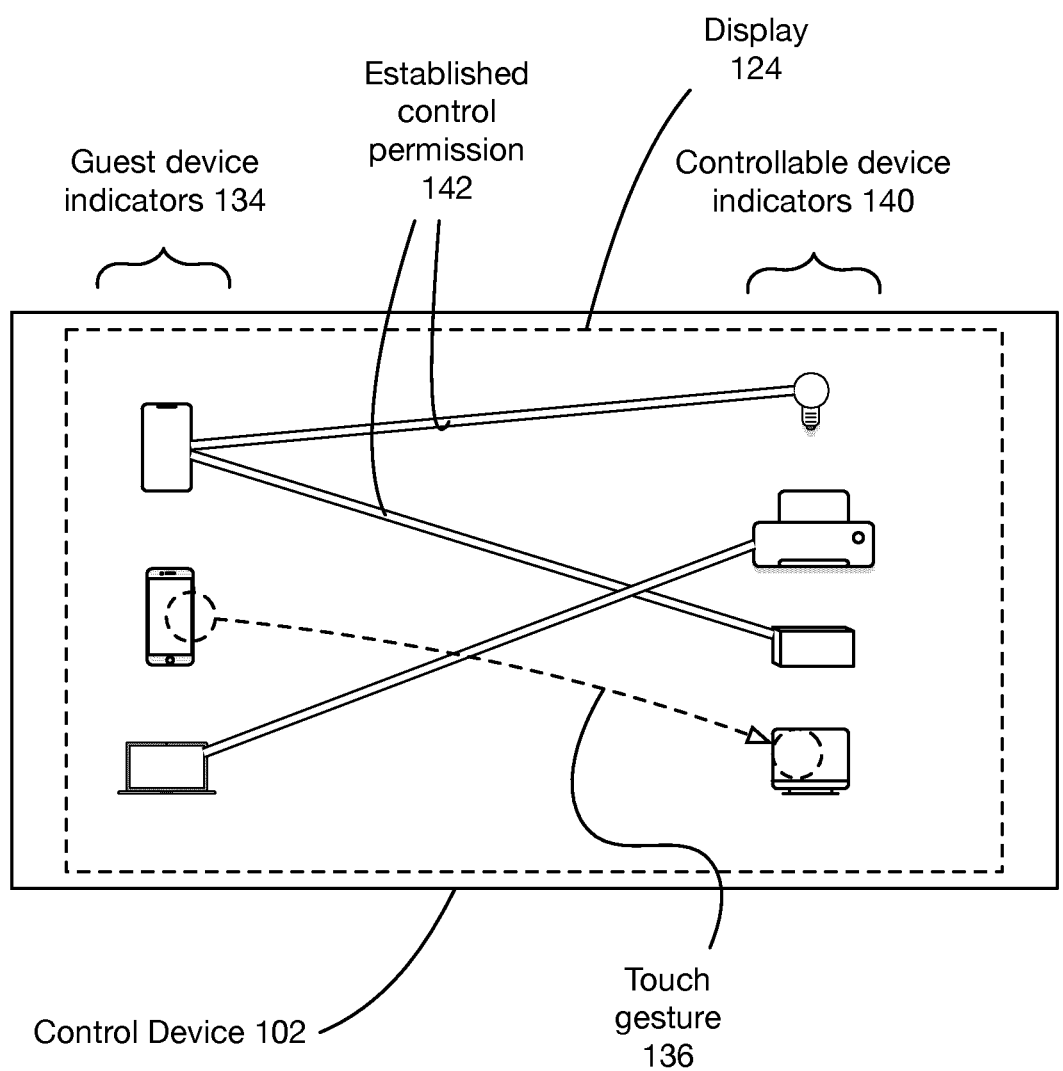
FIG. 1D is an illustration of a user interface for configuration of network communications and remote control, according to some implementations.

FIG. 1D is an illustration of a user interface for configuration of network communications and remote control, according to some implementations. In the example shown, a control device 102 may display a user interface via display 124 comprising indicators of guest devices 134 and controllable device indicators 140. Via touch gestures 136 between a guest device 134 and a controllable device, a "control link" may be enabled, shown with connected lines 142 in the example interface of FIG. 1D.

These permissions may be applied in various ways depending on implementation. In one such implementation, once a guest device has connected to the network and been assigned a LAN IP address, an explicit routing table may be configured within a switch of the wireless access point 120, 120' allowing communications between the assigned IP address and an IP address of the control device (or the remote control server) and denying access to other network addresses. For example, if the remote control server has a LAN IP of 192.168.1.2, a smart television to be controlled has an IP address of 192.168.1.3, and the guest device is assigned an IP address of 192.16.1.100, a filter or access list may be configured permitting communications from 192.16.1.100 to 192.168.1.2, but denying any other address (or denying other addresses on the LAN subnet, such as 192.168.1.*, to allow WAN connectivity). As discussed above, because the remote control interface is provided by the remote control server, the guest device does not need to communicate directly with the controlled device, and such communications can be blocked, preventing potential attacks on IoT devices or smart devices that may have lower security than the control device.

Figure 1E:
FIG. 1E is a table depicting an example configuration of a network, according to some implementations.
Figure 1F:
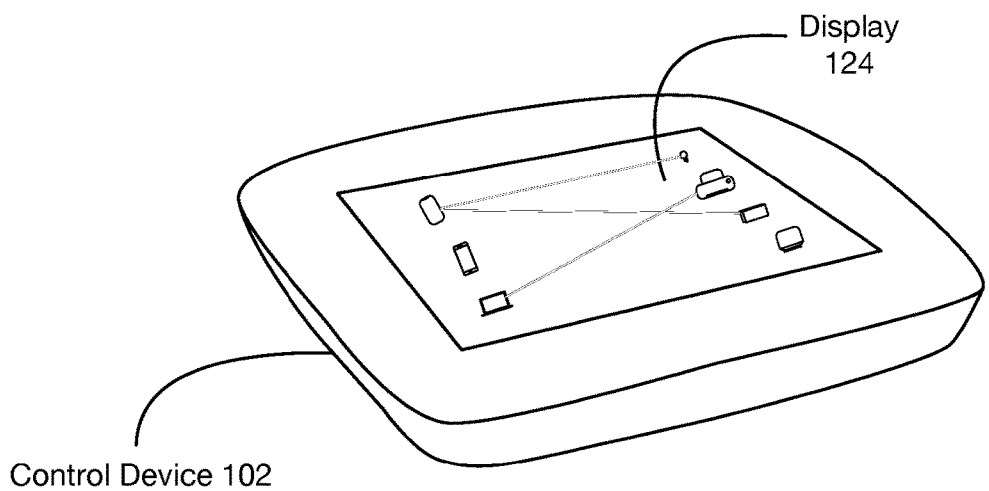
FIG. 1F is an illustration of an example implementation of a network communications and remote control device, according to some implementations.

In another similar implementation, a guest device may be assigned to a virtual LAN (VLAN), and inter-VLAN routes established to allow communications between the guest device and the control device and/or a connected device. Such implementations may be helpful both for enabling direct connectivity between guest devices and controlled devices for uses in which indirect communication via the control device web server is insufficient (e.g. connection to a network printer for direct printing from the guest device, or connection to a video game console or desktop computer for use of the guest device as a controller in which low latency is desired). Such implementations may also be useful for allowing users to easily and intuitively configure security policies for a network and segregate devices to reduce attack vectors. For example, many implementations of VLAN tagging allow for up to 4,094 VLANs on a network. This may be many more devices than are actually connected, in many instances. While using large numbers of VLANs may slightly reduce network performance due to processing overhead, this may allow for easy dynamic application of security policies. For example, FIG. 1E is a table depicting an example configuration of a network, according to some implementations. A control device may be placed in a first VLAN (e.g. VLAN 1). One or more "authorized" devices, such as desktop computers, laptop computers, or other devices that are typically connected to the network may be placed in a second VLAN (e.g. VLAN 2). Additional IoT devices or other network devices that should be segregated from the first group of devices (e.g. due to lack of security or user control over security) may be placed in a third VLAN (e.g. VLAN 3), and permissions may be set to prevent communication between this group and the group of authorized devices. For example, a user's desktop computer may be placed in VLAN 2, while the user's smart thermostat—which may need to communicate to a command and control server via the Internet to receive updates and/or allow control from a user's mobile device via a cellular network or the Internet—may be placed in VLAN 3 and communications between VLAN 2 and 3 disabled or blocked.

While some network administrators may configure VLANs and inter-VLAN routing manually to provide enhanced security (e.g. segregating IoT devices and "work" devices, or separating devices of different departments within an enterprise organization), configuration is typically difficult and unintuitive, requiring manual assignment and modification of firmware or switch configurations. However, via the gesture-based interfaces provided herein, the same functionality may be achieved without requiring users to manually set any configuration parameters, simply by dragging connections to set permitted inter-VLAN routes or removing connections to set denied routes (although only guest devices and controlled devices are shown in the example interface of FIG. 1D for brevity, in some implementations, all network devices or groupings of devices may be displayed, allowing a user or administrator to set permissions for the entire network).

In some implementations, devices sharing a common characteristic (e.g. from a single manufacturer or being of the same type) may be placed in the same VLAN, reducing overhead and complexity. For example, home automation systems with smart lighting may have dozens of light fixtures around the home with WiFi connectivity to the LAN, all under control of a single application (e.g. the Google Home or Apple Home automation applications provided respectively by Google Inc. and Apple Inc.). Each smart light fixture may be assigned to the same VLAN, such that a device in another VLAN may be configured to communicate with all of the lights via a single inter-VLAN communication policy.

In some implementations, guest devices may be assigned to their own VLAN, with inter-VLAN policies set to enable communications only with selected devices (and/or with the control device). In many implementations, setting a VLAN for a device may require modifying networking settings on the device, which may be unintuitive and difficult for many users, hence why such security methods are rarely applied. However, in some implementations, dynamic VLANs may be utilized, with a new dynamic VLAN being established for each guest device (and de-established or removed after the device disconnects or responsive to expiration of a timer). Advantageously, this does not require using a different SSID for each VLAN, as in many other system configurations. In such implementations, the control device 102 and/or wireless access point 120' may include a remote authentication dial-in user server (RADIUS) server, configured to establish dynamic VLANs in response to a request from a control device 102 or other user device to provide access to a guest device 104. In some such implementations, the guest device does not need to explicitly authenticate with the RADIUS server; instead, each VLAN may be assigned a different password or passphrase, such that the guest device may be assigned to the designated dynamic VLAN in response to providing the corresponding password or passphrase when connecting to the SSID. This can be done very efficiently and intuitively with dynamically generated visual codes for connection to the network, as discussed above. For example, still referring to the example of FIG. 1E, when a first user wishes to connect a first guest device (e.g. guest device A) to the network, the control device and/or access point may configure a new dynamic VLAN (e.g. VLAN 5), and assign it a new passphrase (e.g. a random alphanumeric string, a random dictionary word, a numeric sequence, etc., such as "123456"). The control device and/or access point may generate a visual code encoding the SSID, encryption type, and assigned passphrase; and the guest device A may capture and decode the code and join the network using the assigned passphrase, allowing the switch to automatically assign the guest device to the desired VLAN 5. Similarly, when a second user wishes to connect a second guest device (e.g. guest device B), a new dynamic VLAN may be configured with a new passphrase (e.g. VLAN 6 and passphrase "abcdef"), and a new visual code generated and displayed for capture by guest device B. Thus, each guest device may be automatically assigned to and join its own VLAN, and the control device may set inter-VLAN access permissions for each guest device individually, according to the policies set in the gesture-based user interface as discussed above (or according to default policies, etc.). In the example shown in FIG. 1E, for instance, guest device A is assigned to VLAN 5 and has permission to communicate with VLAN 4 (which may include, for example, a network printer) and VLAN 1 (including the control device, for remote control of other devices as discussed above); and guest device B is assigned to VLAN 6 and has permission to communicate with only the control device at VLAN 1, and the WAN (e.g. via the permit "any" list, allowing communication to any addresses not set in the deny list, which includes each other VLAN). As discussed above, to prevent the number of VLANs from growing too large and/or to provide a temporal limit on network access, in some implementations, dynamic VLANs and their configurations may be deleted responsive to the corresponding guest device disconnecting from the network and/or expiration of a timer (e.g. set to a predetermined duration, such as 1 hour, 4 hours, 1 day, or any other such time period).

In other implementations, other methods of segregating guest devices from other network devices may be applied, such as using separate SSIDs for guest devices (though this may be limited in the number of guest devices able to access the system simultaneously), or assigning guest devices to a separate subnet or subnets.

Figure 2:
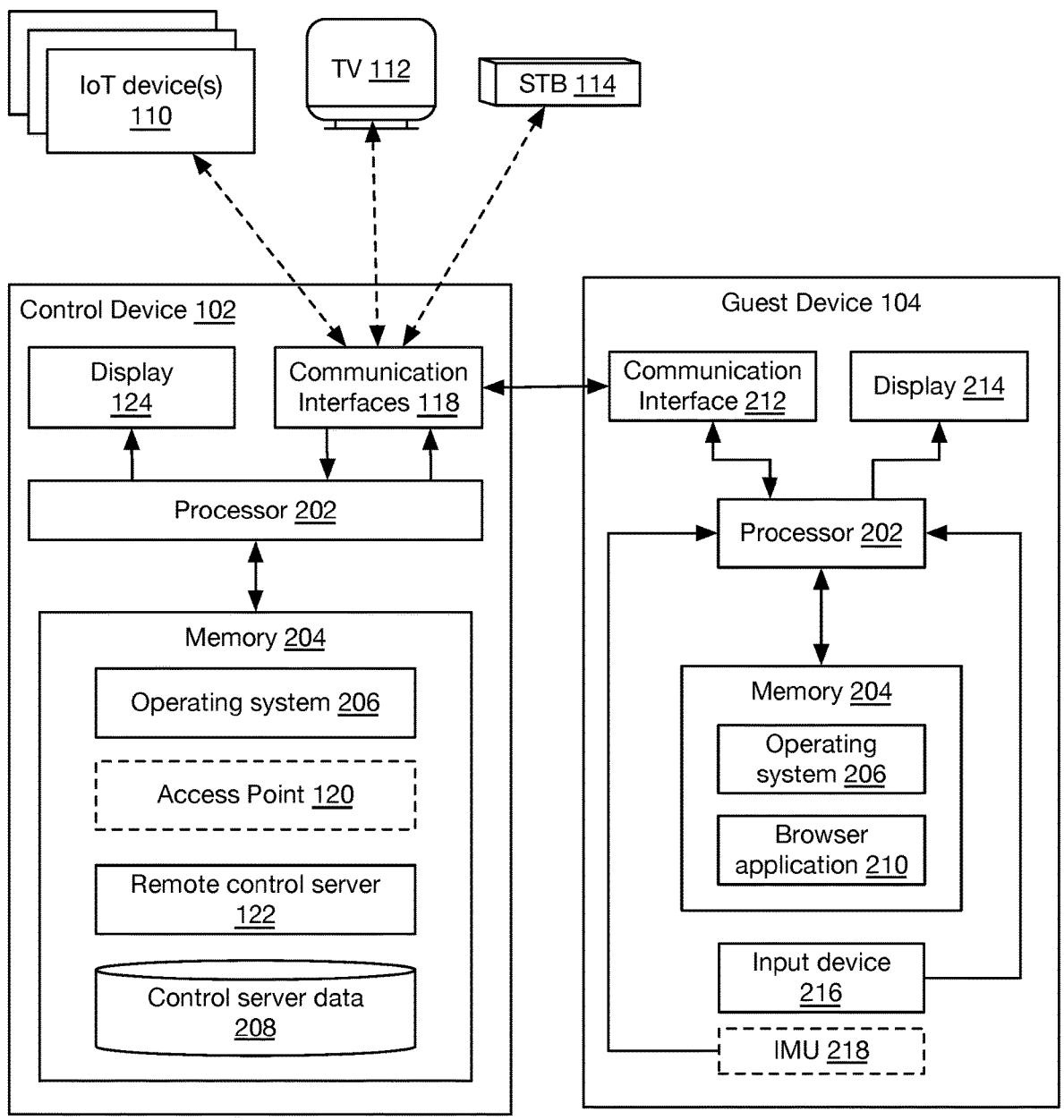
FIG. 2 is a block diagram of a system for network configuration and communications for remote control, according to some implementations.

FIG. 2 is a block diagram of a system for network configuration and communications for remote control, according to some implementations, showing additional details of implementations of a control device 102 and guest device 104 (with additional network devices and segments not illustrated). As discussed above, control device 102 may have a desktop form factor, similar to other network access devices such as a router or access point, or may have a handheld form factor similar to a universal remote control or other such device, or any other such form factor in various implementations. Control device 102 may comprise a display 124, such as an LED or OLED display, eINK display, or other type and form of display, which may include capacitive or resistive input sensors. In some implementations, control device 102 may include additional sensors or buttons such as hardware buttons (e.g. to turn on display 124 for use, to trigger display of a visual code for network configuration for a guest device 104, etc.). In other implementations, control device 102 may communicate with a display of another device (e.g. a television or monitor, a mobile device, etc.) and thus may not include a display itself. Control device 102 may include one or more communications interfaces 118, including for communication via a LAN (not illustrated) such as a WiFi interface or Ethernet interface, and, in some implementations, for communicating with paired devices (e.g. devices 110-114 or any other such devices) via Bluetooth or other short or medium range wireless protocols. In some implementations, control device 102 may include infrared transceivers, near field communication (NFC) transceivers, cellular modems, or other such interfaces.

In some implementations, control device 102 may comprise one or more processors 202. A processor 202 may comprise a single-core or multi-core processor circuit, and may be referred to as a central processing unit (CPU) or by other such terms. Processor(s) 202 may be configured to execute code stored in a memory device or circuit 204, including executable code or logic of an operating system 206, access point 120, and/or remote control server 122, or any other applications, services, servers, or other logic. Memory device 204 may comprise any type of storage device, including flash memory, random access memory (RAM), read-only memory (ROM), hard drives, solid state drives, or other storage.

In some implementations, a processor 202 may execute an operating system 206. Operating system 206 may comprise executable logic for managing communications via communications interfaces 118 (including network communication drivers or a network stack or stacks), executing read/write operations to and from memory 204, controlling output to a display 124 (e.g. via display drivers), reading inputs from sensors (e.g. touchscreen sensors of a display 124 or other input devices), or any other such functions. In some implementations, operating system 206 may comprise functionality for receiving and processing data received via communications interfaces 118, translating commands received via interfaces 118 into other commands (e.g. control requests via an API to Bluetooth commands to a paired device), or other such control of operations of a remote control server 122.

Memory 204 may store control server data 208, which may comprise one or more data files or executable code for rendering control user interfaces and interacting with a remote control server 122. In some implementations, control server data 208 may comprise a mapping of requests to device remote control commands (e.g. mapping between parameter-value pairs received in an HTTP request from a guest device to corresponding remote control commands for a device), for example in XML or JSON format, as an array, database, flat file, or in any other such format. In some implementations, control server data 208 may comprise executable code of one or more web pages for control of one or more devices, including interactive user interface elements (e.g. buttons, sliders, etc.) and corresponding executable logic to transmit requests upon interaction of the interface elements by a user of a guest device displaying the web pages. In some implementations, control server data 208 may comprise identifications of devices and/or configurations for network security policies for a network switch and/or access point 120, such as VLAN configurations, inter-VLAN or inter-subnet access control policies, inter-device communication or control policies, or other such parameters and settings.

As discussed above, in some implementations, memory 204 may store executable logic of a remote control server 122, which may comprise a web server, application server, or other such server or service for generating visual codes for access to a network, controlling VLAN or subnet assignments, and/or providing remote control user interfaces or web pages to one or more guest devices for different network devices.

Guest device 104 may comprise any type and form of computing device, such as a portable computer, desktop computer, tablet computer, smartphone, wearable computer, appliance, or other such device, and may include one or more processors 202 and memory devices 204. Guest device 104 may comprise a communication interface 212 such as a wireless network interface (e.g. WiFi). In some implementations, guest device 104 may comprise other communications interfaces, including cellular, Bluetooth, or other such interfaces. Guest device 104 may also comprise a display 214, similar to a display 124, which may comprise an LED display, OLED display, eInk display, capacitive or resistive touchscreen display, etc. Guest device 104 may execute an operating system 206, which may be similar to or different from the operating system 206 of a control device 102.

Guest device 104 may comprise one or more input devices 216, including a touchscreen, keypad, mouse, touchpad, or other such interface. Guest device 104 may also comprise one or more cameras, such as a camera for capturing a visual network configuration code displayed by display 124 of a control device 102 or access point 120'. In some implementations, guest device 104 may comprise an inertial measurement unit (IMU), which may include accelerometers, compasses, gyroscopes, magnetometers, strain gauges, or other circuits for determining translation and/or rotation of the guest device 104 in one or more translational or rotational degrees of freedom. For example, in some implementations, values from an IMU may be transmitted as control data to a remote control server 122 for redirection or retransmission to a network device, such as pointing or gesture information when the device is used as an "air mouse" or 6 degree-of-freedom (DoF) controller.

Guest device 104 may execute a browser application 210, which may comprise an application, service, server, daemon, routine, or other executable logic for accessing or retrieving a web page or other code of a user interface provided by a remote control server 122. As discussed above, in some implementations, the browser application 210 may be configured to attempt to access a predetermined network address responsive to connection to a wireless network (e.g. a captive portal address). A request to the address may be intercepted and/or redirected to the remote control server 122 by the access point 120 or switch as discussed above (e.g. via HTTP redirection, ICMP redirection, DNS spoofing or redirection, or any other such method). The browser application 210 may be configured to execute and render web pages or other user interface elements in accordance with the retrieved code, and to generate and/or transmit requests responsive to detecting an interaction (e.g. click, drag, etc.) with an interactive element of the user interface or web page (and/or transmit requests including IMU data values as discussed above).

Figure 3A:
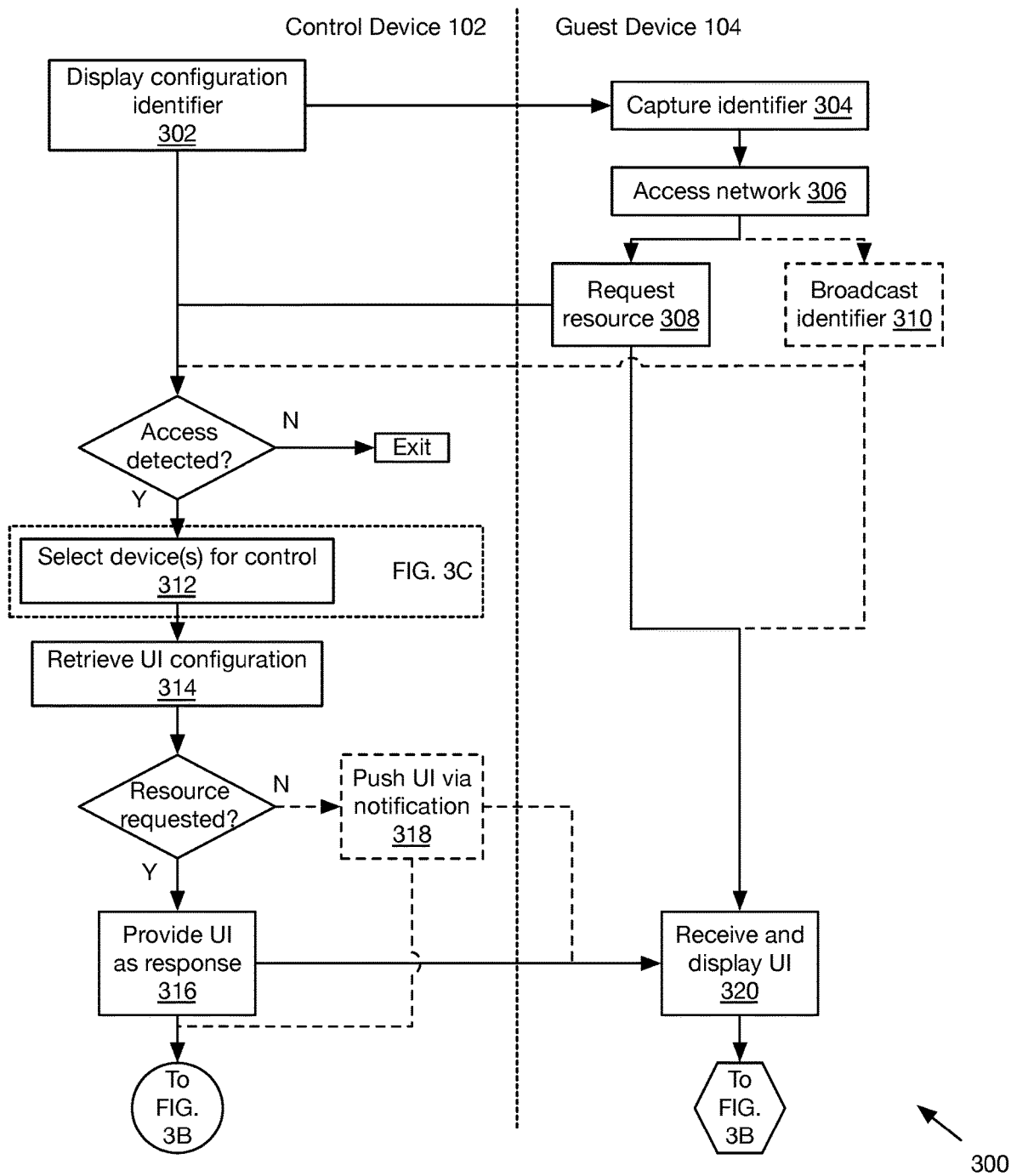
FIGS. 3A-3D are flow charts of methods for network configuration and communications for remote control, according to some implementations.

FIGS. 3A-3D are flow charts of methods for network configuration and communications for remote control, according to some implementations. Referring first to FIG. 3A, operations by a control device 102 are shown to the left of the dotted line and operations by a guest interface 104 are shown to the right of the dotted line, with inter-device communications represented by arrows crossing the dotted line. The operations of each device may be performed simultaneously and asynchronously, in many implementations.

Referring first to FIG. 3A, in some implementations, a control device 102 may display a configuration identifier for a network configuration at step 302. The configuration identifier may comprise a visual code, such as a QR code, and encode network settings such as an SSID, encryption type, passphrase, etc. As discussed above, in some implementations using subnets or VLANs or similar device segregation, the configuration identifier may be dynamically generated and include a unique or semi-unique passphrase or other device-specific code. The code may be displayed via a display of the control device and/or via a display in communication with the control device (e.g. a monitor, smart television, tablet computer, etc.).

At step 304, the guest device 104 may capture the identifier via a camera of the guest device, and may identify the visual code and extract the encoded configuration information. In many implementations, the guest device 104 may notify a user that it has detected the code and seek permission to join the network. Upon receiving permission, or automatically in some implementations, at step 306, the guest device 104 may join the network according to the encoded configuration information. Joining the network may comprise performing handshaking or synchronization steps or otherwise establishing communications with a wireless access point.

Responsive to joining the network, in some implementations, at step 308, the guest device may transmit a request for a resource at a predetermined network address or URL (e.g. an address used a captive portal). As discussed above, in such implementations, the request may be intercepted and/or redirected by the control device or wireless access point to a resource provided by the remote control server of the control device (e.g. via HTTP redirection, ICMP redirection, DNS spoofing, etc.). Different guest devices may use different predetermined addresses for such requests, and in many implementations, the system may intercept and redirect any such requests. In other implementations (shown in dashed line), at step 310, responsive to joining the network, the guest device may broadcast an identifier via the network (e.g. notifying other devices on the network that it is present and available for communications).

The control device 102 may monitor the wireless network for the request and/or broadcast after providing the configuration identifier at step 302. In some implementations, the control device 102 may monitor the wireless network for the request or broadcast for a predetermined time period after displaying the configuration identifier 302. This may be done so that a user may trigger the control device to display the configuration identifier and provide a remote control interface to the next device that connects to the network within the time period, but if the guest device fails to connect within the time period, the control device does not unintentionally trigger delivery of the user interface hours or days later when another device subsequently joins the network. Such implementations may also be helpful if subnetworks or dynamic VLANs are established for the guest device, such that if the device does not connect within the predetermined period of time, the VLAN or subnet configuration may be removed.

If the request or broadcast is received, the control device may identify that the guest device has accessed the network, and in some implementations at step 312, may select one or more devices to be controlled by or communicate with the guest device. For example, the control device may present a user interface, such as the user interface shown in the example of FIG. 1E or a similar interface, with an indicator of the guest device and indicators of one or more additional network devices. Responsive to detecting a user selection or gesture enabling communications between the guest device and the one or more additional network devices, the control device may identify selected network devices with which to enable communications, and may in some implementations, modify routing tables, inter-VLAN access permissions, packet filters or firewalls, or other policy rules to allow communications between the guest device and the selected device. In other implementations, direct communication may not be needed, and all commands may be sent via the control device as an intermediary as discussed above.

Furthermore, as discussed above, in some implementations, step 312 may occur prior to step 302 or during the monitoring period while waiting for a guest device to connect to the network. For example, in some implementations, a user interface for selection of devices to be controlled or communicate with the guest device may be displayed prior to displaying the configuration identifier. Once such network devices are selected, if direct communication is required (e.g. because the user has selected a network device that is not configured for remote control or for which direct communication is most useful for functionality, such as a network printer), then in some implementations as discussed above, a dynamic VLAN may be established and a password or phrase may be generated for accessing the network SSID and assigning devices to the dynamic VLAN. This password or phrase may be encoded into the configuration identifier and displayed at step 302, such that the wireless access point or control device may assign the guest device to the VLAN properly when it accesses the network.

At step 314, the control device may retrieve executable code of a user interface for providing remote control of an additional device to the guest device. As discussed above, the user interface may comprise a web page or application provided by the control device with interactive elements such as buttons, sliders, or other elements for triggering the control device to send corresponding commands to the additional device (e.g. via the network, Bluetooth, infrared, or any other corresponding communication medium). As discussed above, in some implementations, the executable code may comprise instructions for delivering values from an IMU or other sensor of the guest device to the control device (e.g. for gesture-based control or 6 DOF control of devices). In some implementations, the user interface may be created by the user, while in other implementations, the user interface may be created by a device or system manufacturer, or generated automatically by the control device (e.g. based on what commands are available). In some implementations, the user interface may comprise commands for more than one additional device (e.g. a web page with command buttons for control of a television, lighting system, and speakers within an entertainment room). In other implementations, the user interface may include links to control pages for other additional devices may be controlled by the guest device.

If a resource was requested at step 308 and the request was redirected to or intercepted by the control device, then in some implementations at step 316, the control device or remote control server may respond with the code of the user interface for rendering or execution by an application and/or operating system of the guest device at step 320. In some implementations in which the guest device broadcasts an identifier at step 310, the control device may provide the code of the user interface via a pushed notification or pushed data at step 318. Providing the notification or pushed data may comprise performing additional authentication or handshaking steps in some implementations, including displaying a notification on the guest device 104 and receiving a selection from a user of the guest device to accept receipt of and execute the pushed data of the user interface.

Figure 3B:
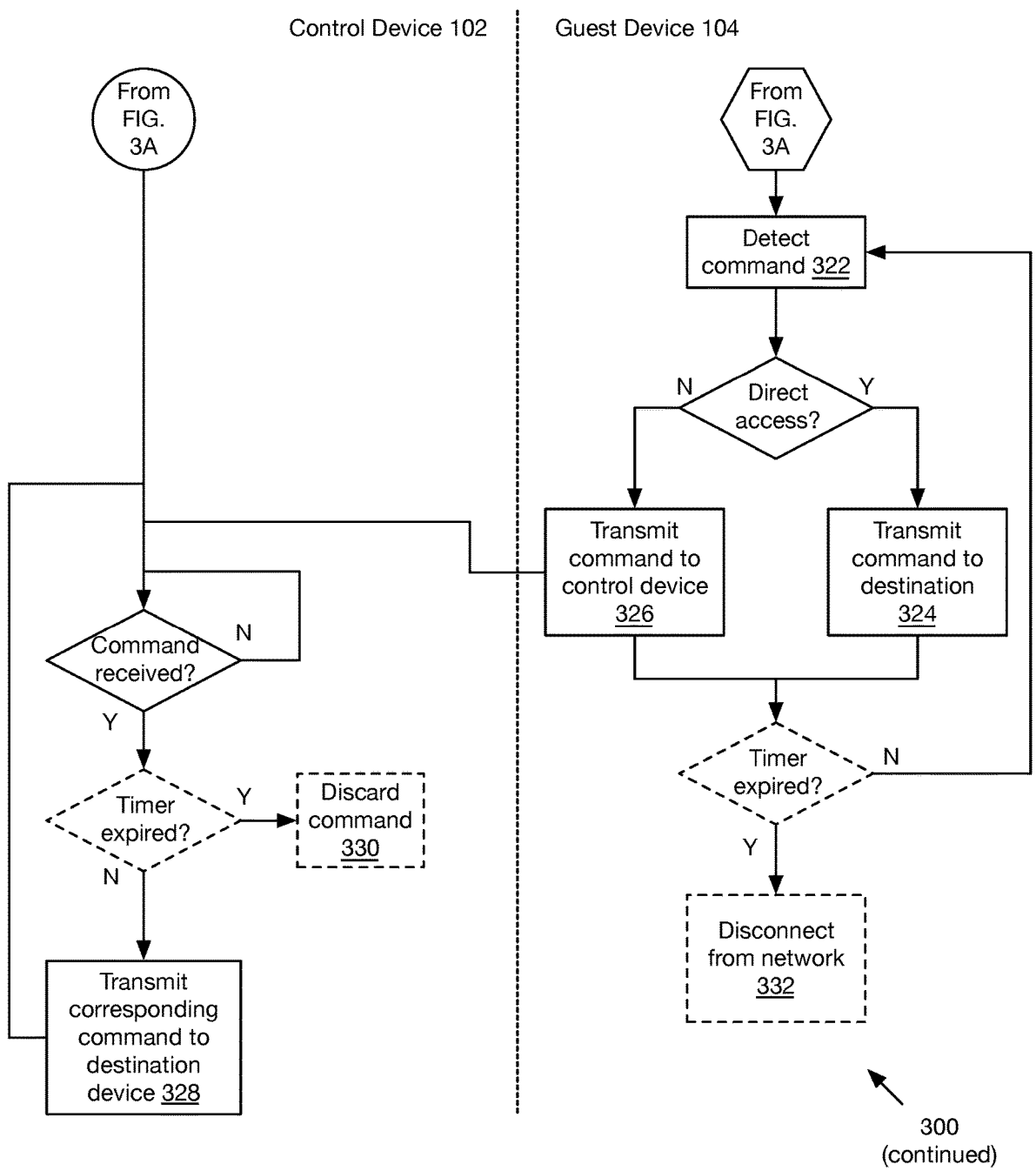

Continuing to FIG. 3B, after rendering and displaying the user interface at step 320, the guest device may detect a selection or command via the user (e.g. detecting selection of a button or link, a value of a slider, a new value of an IMU sensor, etc.). In some implementations in which direct control has been enabled for the guest device (i.e. the code of the user interface includes instructions to transmit requests or remote procedure calls directly to the network address of the intended additional device rather than via the control device), at step 324, the guest device may transmit the command or command parameters specified by the control (e.g. a RESTful request with a parameter-value pair, an API or RPC call, etc.). In other implementations in which the control device acts as an intermediary, at step 326, the guest device may transmit the command or command parameters to the control device for translation and/or forwarding or retransmission to the additional device or devices. In some implementations, commands need not be restricted to a single device; rather, a single button or interactive element of the user interface may be associated with a plurality of commands for a plurality of devices (e.g. a "scene" button that triggers sending a command to a lighting system to lower lights, a second command to an audio/video receiver to configure a "movie" mode, a third command to motorized blinds or shades to close, etc.). This may allow for highly advanced automation, all via a single easy and intuitive interface.

Meanwhile, the control device may wait for a request or command from the guest device. If a request or command is received, then at step 328, the control device may transmit one or more corresponding commands to the additional destination device. As discussed above, the request or command may include parameters or identifiers of a device and/or remote control command. The control device may identify, using the parameters and/or identifiers, a corresponding mapped command and communication method. For example, in one such implementation, upon receipt of an HTTP GET request including parameter-value pairs of "device=television&command=volume_up", the control device may identify a communication method for communicating with the device (e.g. Bluetooth or infrared) and a mapped command corresponding to the requested command (e.g. a code sequence for transmitting a command to increase the volume), and may direct a transceiver or interface of the control device to transmit the mapped command. As discussed above, in some implementations, a request or call may comprise a plurality of commands for one or more devices, and accordingly, step 328 may be repeated for each additional command and/or devices.

In some implementations, remote control access may be temporally limited for guest devices (e.g. to prevent granting guest devices indefinite access, to reduce memory requirements for dynamic VLAN configurations, etc.). Accordingly, in some implementations, the control device may maintain a timer for each guest device. Upon expiration of the timer, the control device may delete subnetwork or VLAN configurations, disconnect the guest device from the network or transmit a command to close the connection to the guest device, and/or discard any subsequently received commands from the guest device at step 330.

Similarly, in some implementations, the guest device may maintain a timer for the guest access session. For example, the executable code of the user interface or web page may comprise instructions to execute a timer and, upon expiration of the timer, disconnect from the network and/or prevent transmitting further commands at step 332.

As discussed above, the steps of method 300 may be performed asynchronously, and also may be repeated for additional guest devices. For example, in some implementations, the control device may provide the same or different user interfaces to a plurality of guest devices simultaneously.

Figure 3C:
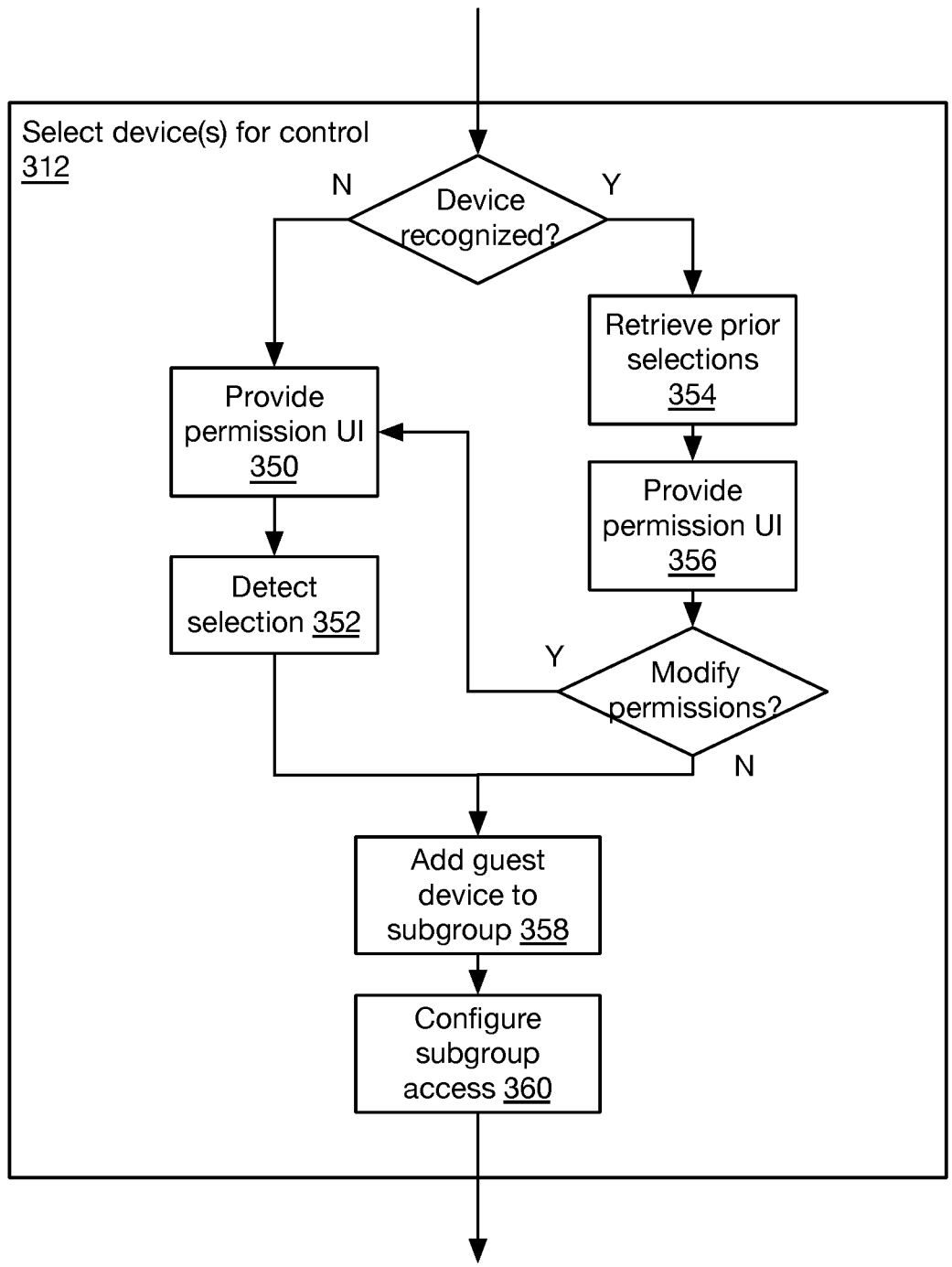

Further implementations of step 312 of FIG. 3A are shown in the flow chart of FIG. 3C. As discussed above, in various implementations, the method of FIG. 3C may occur prior to generation of a visual code identifying a configuration of a network, and/or after identification of a device accessing the network.

In some implementations, each guest device may be treated as a "new" device. In other implementations, a prior remote control configuration for a guest device (e.g. communications selections or selections of additional devices to be controlled) may be stored and retrieved for use if the guest device (or another device associated with the same user) reconnects to the network. Such configurations may be identified according to any appropriate device identifier, such as a MAC address, GUID, account name or ID, or any other such device and/or user-specific identifier. Accordingly, in some such implementations, a control device may determine whether the newly connected device (and/or user of the device) is recognized. If so, prior configuration selections may be retrieved at step 354 and displayed via a user interface at step 356 (e.g. for confirmation or modification by an administrator or user of the control device). If the device is not recognized—or if the implementation does not store prior configurations—then steps 354-356 may be skipped. Instead, at step 350, the user interface may be displayed with indicators of the guest device and one or more additional devices to be controlled or communicated with. Selections may be detected (e.g. by detecting clicks on an additional device or gestures such as dragging lines between the guest device and a selected additional device) at step 352 and the additional devices identified for control or communication.

In some implementations, the guest device may be added to a subgroup or dynamic VLAN at 358. As discussed above, in some implementations, the subgroup or dynamic VLAN may be assigned prior to displaying the configuration identifier of the network for capture by the guest device (e.g. prior to connection to the network), such that a unique passphrase and configuration identifier may be generated. In other implementations, the guest device may be added to a logical subgroup after connection.

Access policies may be applied for the subgroup at step 360. For example, a routing table may be configured to block communications between the IP address of the guest device and any device other than the control device and/or a selected additional device or devices, or inter-VLAN routing may be established to allow or disallow communications between different groups of devices.

Although primarily discussed in terms of single VLANs or groups for each guest device, in some implementations, groups of guest devices may be assigned to the same subgroup or VLAN. For example, in one such implementation, if guest devices are only to be provided remote controls of other devices indirectly via the control device, multiple guest devices may be assigned to a single VLAN or subgroup configured to allow communications with the control device and not with any other additional device. In such implementations, guest devices may be able to communicate with each other via the VLAN or subgroup routing tables, though this may be acceptable, particularly if each guest device is also able to communicate via the Internet. For example, if the VLAN has permissions blocking communications to any other VLAN except one with the control device or externally to a WAN, then it may be irrelevant whether such guest devices can communicate with each other.

Figure 3D:
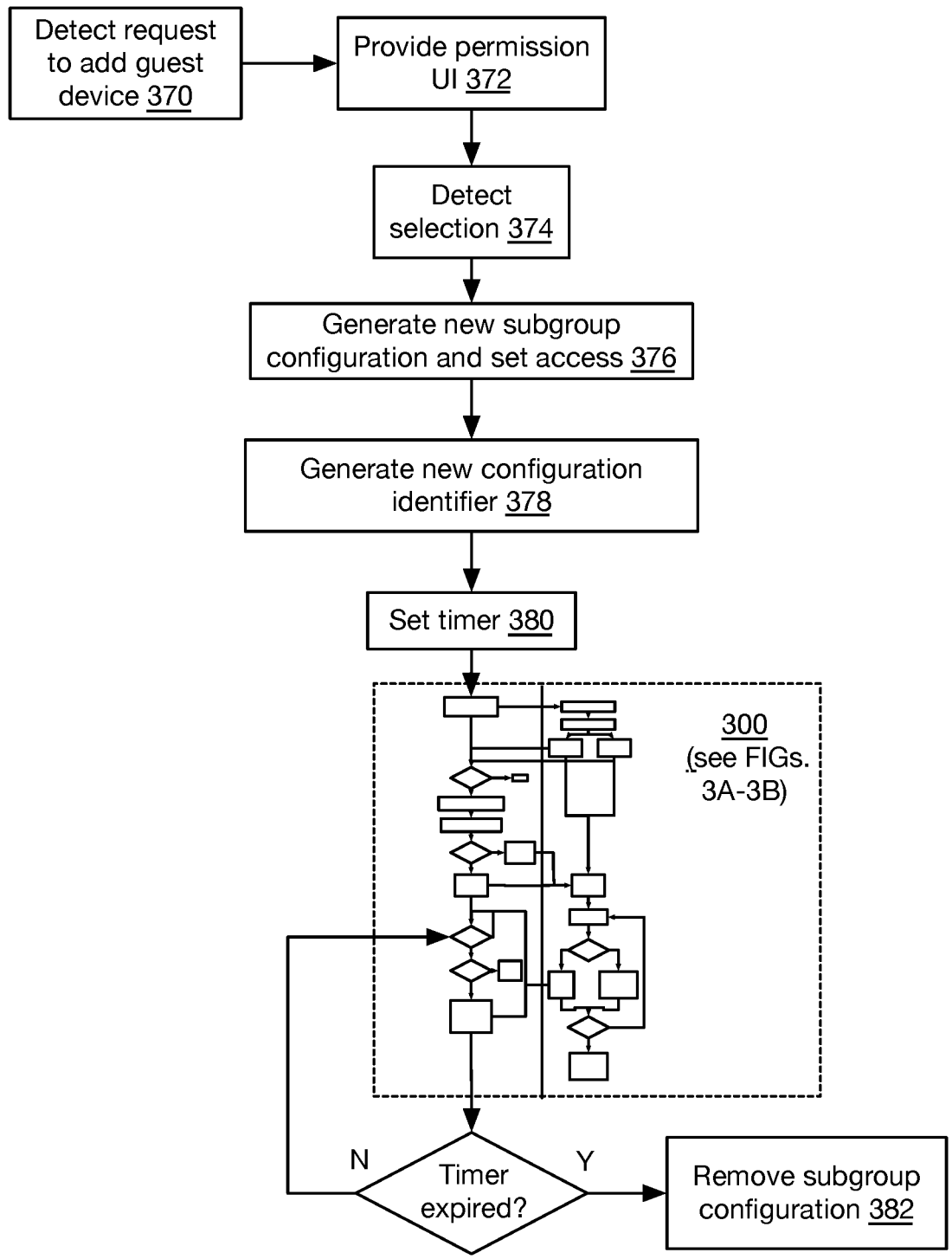

As discussed above, in some implementations, subgroup or VLAN configuration may be established prior to displaying the visual identifier for capture. FIG. 3D is a flow chart of one such implementation, with steps shown in relation to method 300 of FIGS. 3A-3B. At step 370, in some implementations, a control device may detect a request to add a guest device to a network. The request may be detected via interaction with a user interface or button of the control device, or may be received from another device. For example, in some implementations in which the control device comprises a network appliance, the request may be received from another device on the network such as a user's smartphone, a smart remote control, a home automation device such as a smart speaker, etc.

At step 372, the control device may provide a permission user interface for selection of which devices the guest device may communicate with. The user interface may be displayed via a display of the control device, or may be provided to another device (e.g. an authorized user's smartphone or desktop computer, etc.). Once communications settings are selected via the user interface at step 374, at step 376, a new subgroup or dynamic VLAN may be established and access policies generated according to the user interface selections. Generating the access policies may comprise generating inter-VLAN or subnet routing tables or policies, or generating other access controls.

At step 378, a visual code of a configuration identifier may be generated for display and capture by the guest device. As discussed above, in some implementations, a VLAN-specific passphrase or code may be generated such that use of the passphrase when accessing the SSID of the wireless network may direct the wireless access point to place the guest device within the dynamic VLAN. In some other implementations, a separate SSID may be used for guest devices and a visual code may be generated accordingly.

At step 380 in some implementations to reduce memory requirements and provide garbage collection, a timer may be started for guest access. Method 300 may continue as discussed above in connection with FIGS. 3A-3C. Upon expiration of the timer, at step 382, the subgroup or VLAN configuration may be removed and any remaining guest devices assigned to the VLAN or subgroup may be disconnected.

Accordingly, the systems and methods discussed herein provide for easy and intuitive control over network configurations and security for transient or guest devices, and remote control of additional devices, either directly in some implementations, or indirectly via a hosted interface by a control device in other implementations, eliminating the need for pairing or otherwise establishing communications between the guest devices and the additional devices. This may improve network security overall and particularly encourage segregation of untrusted devices, while still providing enhanced functionality and control over other network devices in a secure manner.

In one aspect, the present disclosure is directed to a method for automatic provisioning of remote control capabilities to a computing device. The method includes providing, by a first computing device connected to a network via a display device, a visual identifier of a configuration of the network, the visual identifier captured by a camera of a second computing device and utilized by the second computing device to connect to the network. The method also includes detecting, by the first computing device, connection of the second computing device to the network. The method also includes, responsive to detecting connection of the second computing device to the network, providing, by the first computing device to the second computing device, executable code of a user interface for remote control of one or more additional devices connected to the network, receipt of the executable code causing the second computing device to display the user interface via a browser application of the second computing device.

In some implementations, the method includes receiving, by the first computing device from the second computing device, a remote control command directed to an additional device, the remote control command sent by the second computing responsive to detection by the browser application of an interaction with a control of the user interface. In a further implementation, the method includes redirecting, by the first computing device to the additional device, the remote control command. In a still further implementation, the remote control command further comprises an identification of the additional device and an identification of a command; and redirecting the remote control command further comprises: selecting, by the first computing device, a communication method corresponding to the identified additional device; and transmitting a corresponding command, by the first computing device via the selected communication method. In a still further implementation, the communication method comprises a Bluetooth communication protocol; and the identified additional device is paired to the first computing device and not paired to the second computing device.

In some implementations, detecting connection of the second computing device to the network further comprises:

monitoring, by the first computing device, a wireless communications channel for a predetermined time period, responsive to providing the visual identifier; and detecting, by the first computing device prior to expiration of the predetermined time period, an identifier broadcast by the second computing device via the wireless communications channel responsive to connection of the second computing device to the network. In a further implementation, access to the wireless communications channel is provided to the first computing device and the second computing device via a wireless access point.

In some implementations, detecting connection of the second computing device to the network further comprises: receiving, by the first computing device from the second computing device, a request to access a predetermined network address, the request transmitted by the second computing device responsive to connection of the second computing device to the network; and providing, by the first computing device to the second computing device, the executable code of the user interface responsive to the request. In a further implementation, the first computing device comprises a wireless access point. In another further implementation, receiving the request transmitted by the second computing device responsive to connection of the second computing device to the network further comprises: receiving the request, by the first computing device, from a third computing device comprising a wireless access point, the third computing device receiving the transmitted request from the second computing device and redirecting the request to the first computing device.

In some implementations, the second computing device is prevented from directly communicating with the one or more additional devices. In some implementations, the executable code of the user interface is associated with a time period; and the method further comprises discarding a remote control command received from the second computing device, by the first computing device, responsive to expiration of the time period.

In some implementations, the method includes, responsive to detecting connection of the second computing device to the network and prior to providing the executable code of the user interface for remote control of the one or more additional devices connected to the network to the second computing device: providing, via a second user interface executed by the first computing device or a third computing device, an identification of the second computing device; and receiving, via the second user interface, a selection of an additional device of the one or more additional devices; and providing the executable code of the user interface for remote control to the second computing device further comprises providing the executable code of the user interface for remote control of the selected additional device to the second computing device. In a further implementation, the second computing device is prevented from communicating with additional devices of the one or more additional devices other than the selected additional device. In another further implementation, the second user interface is configured to display indicators of the one or more additional devices and the second computing device, and detect selection of an additional device via a gesture extending between the indicator of the second computing device and the indicator of the selected additional device.

In another aspect, the present disclosure is directed to a method for gesture-based network configuration. The method includes detecting, by a first device connected to a network, connection of a second device to the network. The method also includes displaying, via a user interface executed by the first device responsive to the detection of the connection of the second device, an indicator of the second device and indicators of one or more additional devices connected to the network. The method also includes detecting, by the first device via the user interface, a gesture extending between the indicator of the second device and the indicator of a first additional device. The method also includes configuring, by the first device responsive to detection of the gesture, a network switch of the network to allow communications between the second device and the first additional device.

In some implementations, the method includes configuring the network switch to prevent communications between the second device and any additional device other than the first additional device, responsive to detection of the gesture. In some implementations, the method includes assigning a network address of the second device to a first virtual network and generating a communication policy allowing communications between the first virtual network and a second virtual network including the first additional device and disallowing communications between the first virtual network and one or more additional virtual networks including a corresponding one or more additional devices. In some implementations, the method includes receiving a notification from a third device comprising a wireless access point providing access to the network, the notification sent responsive to connection of the second device to the network.

In another aspect, the present disclosure is directed to a system for automatic provisioning of remote control capabilities to a computing device. The system includes a first computing device comprising a network interface in communication with a network and a processor configured to: provide, via a display device, a visual identifier of a configuration of the network, the visual identifier captured by a camera of a second computing device and utilized by the second computing device to connect to the network; detect connection of the second computing device to the network; responsive to detecting connection of the second computing device to the network, provide, via the network interface to the second computing device, executable code of a user interface for remote control of one or more additional devices connected to the network, receipt of the executable code causing the second computing device to display the user interface via a browser application of the second computing device.

B. Computing and Network Environment

Figure 4A:
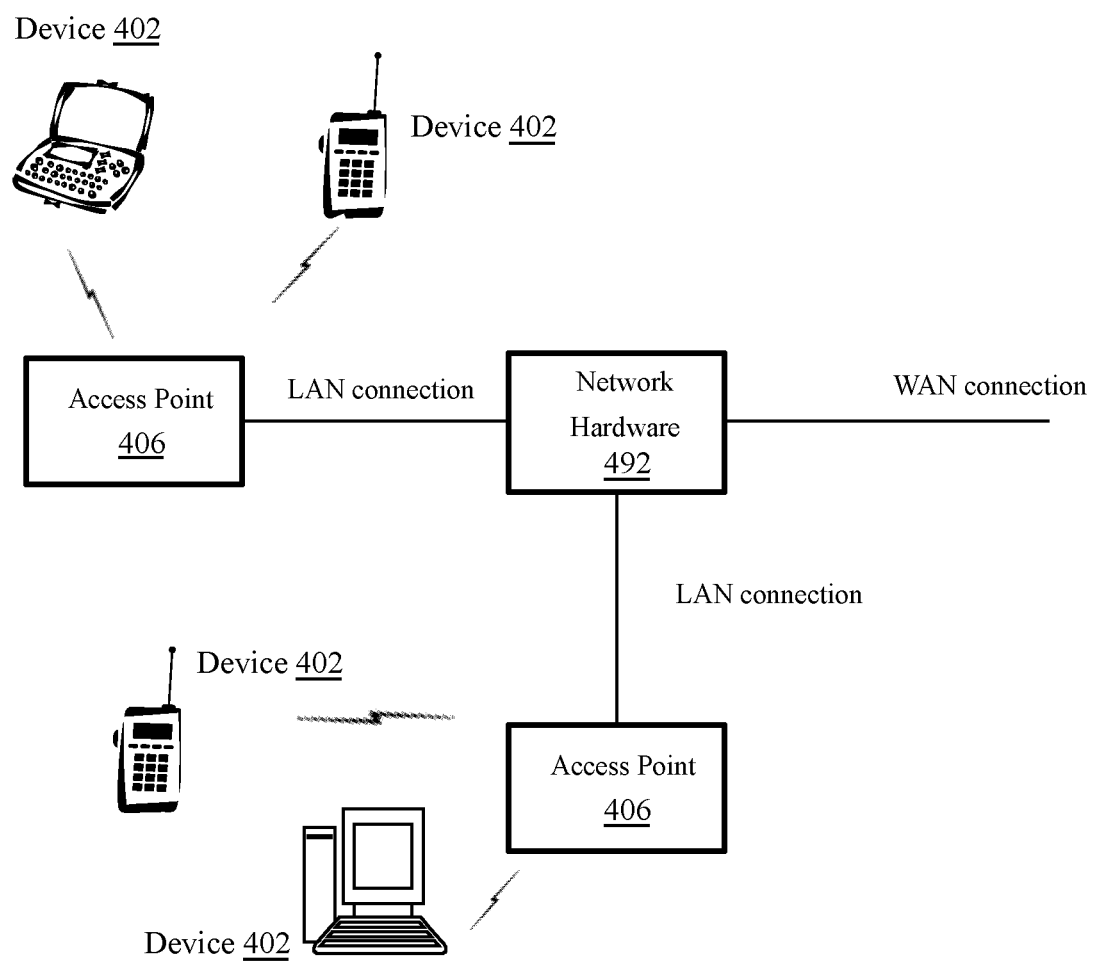
FIG. 4A is a block diagram depicting an embodiment of a network environment including one or more access points in communication with one or more devices or stations.

Having discussed specific embodiments of the present solution, it may be helpful to describe aspects of the operating environment as well as associated system components (e.g., hardware elements) in connection with the methods and systems described herein. Referring to FIG. 4A, an embodiment of a network environment is depicted. In brief overview, the network environment includes a wireless communication system that includes one or more access points 406, one or more wireless communication devices 402 and a network hardware component 492. The wireless communication devices 402 may for example include laptop computers 402, tablets 402, personal computers 402 and/or cellular telephone devices 402. The details of an embodiment of each wireless communication device and/or access point are described in greater detail with reference to FIGS. 4B and 4C. The network environment can be an ad hoc network environment, an infrastructure wireless network environment, a subnet environment, etc. in one embodiment The access points (APs) 406 may be operably coupled to the network hardware 492 via local area network connections. The network hardware 492, which may include a router, gateway, switch, bridge, modem, system controller, appliance, etc., may provide a local area network connection for the communication system. Each of the access points 406 may have an associated antenna or an antenna array to communicate with the wireless communication devices 402 in its area. The wireless communication devices 402 may register with a particular access point 406 to receive services from the communication system (e.g., via a SU-MIMO or MU-MIMO configuration). For direct connections (e.g., point-to-point communications), some wireless communication devices 402 may communicate directly via an allocated channel and communications protocol. Some of the wireless communication devices 402 may be mobile or relatively static with respect to the access point 406.

In some embodiments an access point 406 includes a device or module (including a combination of hardware and software) that allows wireless communication devices 402 to connect to a wired network using Wi-Fi, or other standards. An access point 406 may sometimes be referred to as an wireless access point (WAP). An access point 406 may be configured, designed and/or built for operating in a wireless local area network (WLAN). An access point 406 may connect to a router (e.g., via a wired network) as a standalone device in some embodiments. In other embodiments, an access point can be a component of a router. An access point 406 can provide multiple devices 402 access to a network. An access point 406 may, for example, connect to a wired Ethernet connection and provide wireless connections using radio frequency links for other devices 402 to utilize that wired connection. An access point 406 may be built and/or configured to support a standard for sending and receiving data using one or more radio frequencies. Those standards, and the frequencies they use may be defined by the IEEE (e.g., IEEE 802.11 standards). An access point may be configured and/or used to support public Internet hotspots, and/or on an internal network to extend the network's Wi-Fi signal range.

In some embodiments, the access points 406 may be used for (e.g., in-home or in-building) wireless networks (e.g., IEEE 802.11, Bluetooth, ZigBee, any other type of radio frequency based network protocol and/or variations thereof). Each of the wireless communication devices 402 may include a built-in radio and/or is coupled to a radio. Such wireless communication devices 402 and/or access points 406 may operate in accordance with the various aspects of the disclosure as presented herein to enhance performance, reduce costs and/or size, and/or enhance broadband applications. Each wireless communication devices 402 may have the capacity to function as a client node seeking access to resources (e.g., data, and connection to networked nodes such as servers) via one or more access points 406.

The network connections may include any type and/or form of network and may include any of the following: a point-to-point network, a broadcast network, a telecommunications network, a data communication network, a computer network. The topology of the network may be a bus, star, or ring network topology. The network may be of any such network topology as known to those ordinarily skilled in the art capable of supporting the operations described herein. In some embodiments, different types of data may be transmitted via different protocols. In other embodiments, the same types of data may be transmitted via different protocols.

Figure 4B:
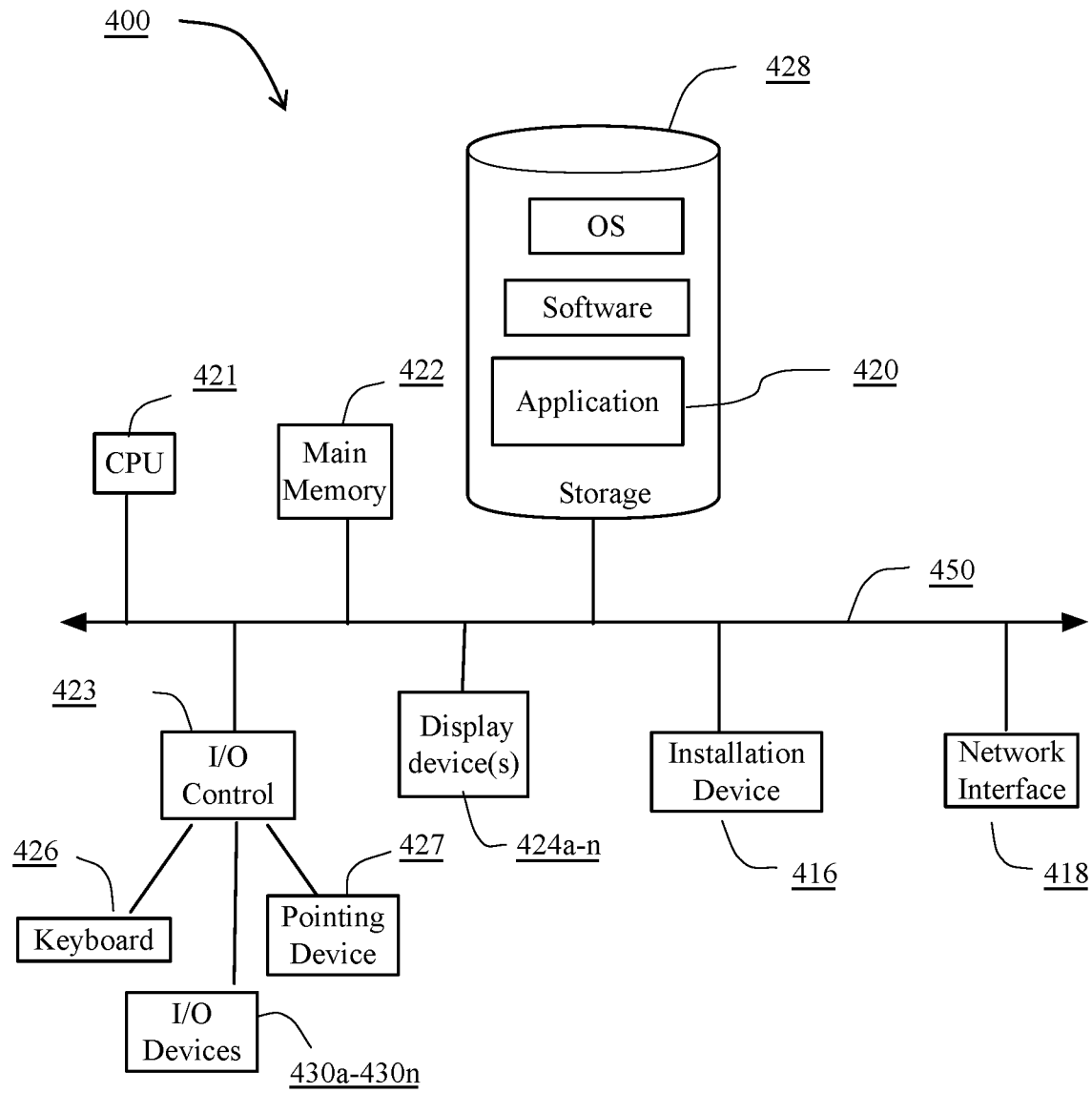
FIGS. 4B and 4C are block diagrams depicting embodiments of computing devices useful in connection with the methods and systems described herein.
Figure 4C:
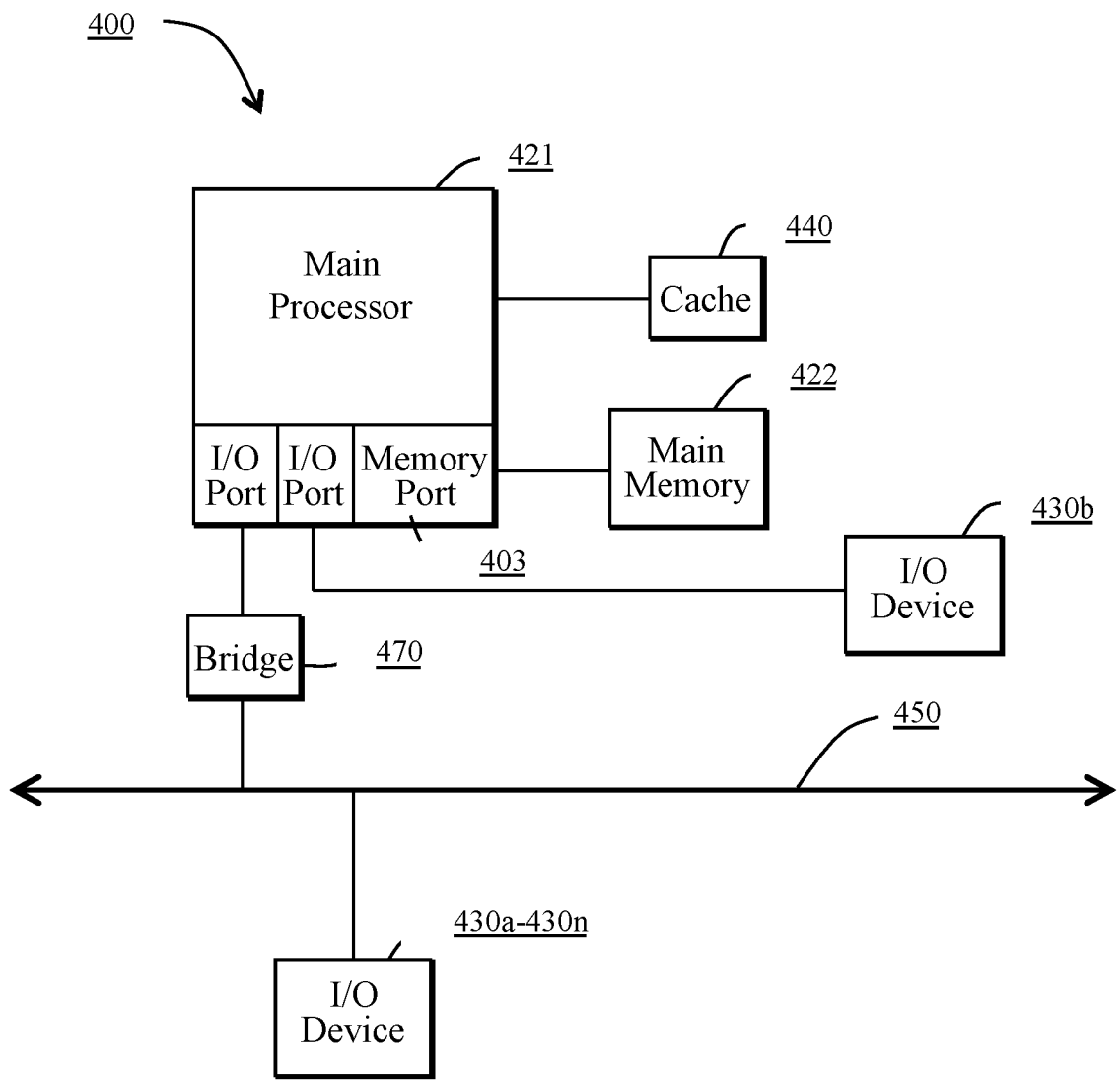

The communications device(s) 402 and access point(s) 406 may be deployed as and/or executed on any type and form of computing device, such as a computer, network device or appliance capable of communicating on any type and form of network and performing the operations described herein. FIGS. 4B and 4C depict block diagrams of a computing device 400 useful for practicing an embodiment of the wireless communication devices 402 or the access point 406. As shown in FIGS. 4B and 4C, each computing device 400 includes a central processing unit 421, and a main memory unit 422. As shown in FIG. 4B, a computing device 400 may include a storage device 428, an installation device 416, a network interface 418, an I/O controller 423, display devices 424a-424n, a keyboard 426 and a pointing device 427, such as a mouse. The storage device 428 may include, without limitation, an operating system and/or software. As shown in FIG. 4C, each computing device 400 may also include additional optional elements, such as a memory port 403, a bridge 470, one or more input/output devices 430a-430n (generally referred to using reference numeral 430), and a cache memory 440 in communication with the central processing unit 421.

The central processing unit 421 is any logic circuitry that responds to and processes instructions fetched from the main memory unit 422. In many embodiments, the central processing unit 421 is provided by a microprocessor unit, such as: those manufactured by Intel Corporation of Mountain View, Calif.; those manufactured by International Business Machines of White Plains, N.Y.; or those manufactured by Advanced Micro Devices of Sunnyvale, Calif. The computing device 400 may be based on any of these processors, or any other processor capable of operating as described herein.

Main memory unit 422 may be one or more memory chips capable of storing data and allowing any storage location to be directly accessed by the microprocessor 421, such as any type or variant of Static random access memory (SRAM), Dynamic random access memory (DRAM), Ferroelectric RAM (FRAM), NAND Flash, NOR Flash and Solid State Drives (SSD). The main memory 422 may be based on any of the above described memory chips, or any other available memory chips capable of operating as described herein. In the embodiment shown in FIG. 4B, the processor 421 communicates with main memory 422 via a system bus 450 (described in more detail below). FIG. 4C depicts an embodiment of a computing device 400 in which the processor communicates directly with main memory 422 via a memory port 403. For example, in FIG. 4C the main memory 422 may be DRDRAM.

FIG. 4C depicts an embodiment in which the main processor 421 communicates directly with cache memory 440 via a secondary bus, sometimes referred to as a backside bus. In other embodiments, the main processor 421 communicates with cache memory 440 using the system bus 450. Cache memory 440 typically has a faster response time than main memory 422 and is provided by, for example, SRAM, BSRAM, or EDRAM. In the embodiment shown in FIG. 4C, the processor 421 communicates with various I/O devices 430 via a local system bus 450. Various buses may be used to connect the central processing unit 421 to any of the I/O devices 430, for example, a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 424, the processor 421 may use an Advanced Graphics Port (AGP) to communicate with the display 424. FIG. 4C depicts an embodiment of a computer 400 in which the main processor 421 may communicate directly with I/O device 430b, for example via HYPERTRANSPORT, RAPIDIO, or INFINIBAND communications technology. FIG. 4C also depicts an embodiment in which local busses and direct communication are mixed: the processor 421 communicates with I/O device 430a using a local interconnect bus while communicating with I/O device 430b directly.

A wide variety of I/O devices 430a-430n may be present in the computing device 400. Input devices include keyboards, mice, trackpads, trackballs, microphones, dials, touch pads, touch screen, and drawing tablets. Output devices include video displays, speakers, inkjet printers, laser printers, projectors and dye-sublimation printers. The I/O devices may be controlled by an I/O controller 423 as shown in FIG. 4B. The I/O controller may control one or more I/O devices such as a keyboard 426 and a pointing device 427, e.g., a mouse or optical pen. Furthermore, an I/O device may also provide storage and/or an installation medium 416 for the computing device 400. In still other embodiments, the computing device 400 may provide USB connections (not shown) to receive handheld USB storage devices such as the USB Flash Drive line of devices manufactured by Twintech Industry, Inc. of Los Alamitos, Calif.

Referring again to FIG. 4B, the computing device 400 may support any suitable installation device 416, such as a disk drive, a CD-ROM drive, a CD-R/RW drive, a DVD-ROM drive, a flash memory drive, tape drives of various formats, USB device, hard-drive, a network interface, or any other device suitable for installing software and programs. The computing device 400 may further include a storage device, such as one or more hard disk drives or redundant arrays of independent disks, for storing an operating system and other related software, and for storing application software programs such as any program or software 420 for implementing (e.g., configured and/or designed for) the systems and methods described herein. Optionally, any of the installation devices 416 could also be used as the storage device. Additionally, the operating system and the software can be run from a bootable medium.

Furthermore, the computing device 400 may include a network interface 418 to interface to the network 404 through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, IEEE 802.11n, IEEE 802.11ac, IEEE 802.11ad, CDMA, GSM, WiMax and direct asynchronous connections). In one embodiment, the computing device 400 communicates with other computing devices 400' via any type and/or form of gateway or tunneling protocol such as Secure Socket Layer (SSL) or Transport Layer Security (TLS). The network interface 418 may include a built-in network adapter, network interface card, PCMCIA network card, card bus network adapter, wireless network adapter, USB network adapter, modem or any other device suitable for interfacing the computing device 400 to any type of network capable of communication and performing the operations described herein.

In some embodiments, the computing device 400 may include or be connected to one or more display devices 424a-424n. As such, any of the I/O devices 430a-430n and/or the I/O controller 423 may include any type and/or form of suitable hardware, software, or combination of hardware and software to support, enable or provide for the connection and use of the display device(s) 424a-424n by the computing device 400. For example, the computing device 400 may include any type and/or form of video adapter, video card, driver, and/or library to interface, communicate, connect or otherwise use the display device(s) 424a-424n. In one embodiment, a video adapter may include multiple connectors to interface to the display device(s) 424a-424n. In other embodiments, the computing device 400 may include multiple video adapters, with each video adapter connected to the display device(s) 424a-424n. In some embodiments, any portion of the operating system of the computing device 400 may be configured for using multiple displays 424a-424n. One ordinarily skilled in the art will recognize and appreciate the various ways and embodiments that a computing device 400 may be configured to have one or more display devices 424a-424n.

In further embodiments, an I/O device 430 may be a bridge between the system bus 450 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a FibreChannel bus, a Serial Attached small computer system interface bus, a USB connection, or a HDMI bus.

A computing device 400 of the sort depicted in FIGS. 4B and 4C may operate under the control of an operating system, which control scheduling of tasks and access to system resources. The computing device 400 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: Android, produced by Google Inc.; WINDOWS 7 and 8, produced by Microsoft Corporation of Redmond, Wash.; MAC OS, produced by Apple Computer of Cupertino, Calif.; WebOS, produced by Research In Motion (RIM); OS/2, produced by International Business Machines of Armonk, N.Y.; and Linux, a freely-available operating system distributed by Caldera Corp. of Salt Lake City, Utah, or any type and/or form of a Unix operating system, among others.

The computer system 400 can be any workstation, telephone, desktop computer, laptop or notebook computer, server, handheld computer, mobile telephone or other portable telecommunications device, media playing device, a gaming system, mobile computing device, or any other type and/or form of computing, telecommunications or media device that is capable of communication. The computer system 400 has sufficient processor power and memory capacity to perform the operations described herein.

In some embodiments, the computing device 400 may have different processors, operating systems, and input devices consistent with the device. For example, in one embodiment, the computing device 400 is a smart phone, mobile device, tablet or personal digital assistant. In still other embodiments, the computing device 400 is an Android-based mobile device, an iPhone smart phone manufactured by Apple Computer of Cupertino, Calif., or a Blackberry or WebOS-based handheld device or smart phone, such as the devices manufactured by Research In Motion Limited. Moreover, the computing device 400 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

Although the disclosure may reference one or more "users", such "users" may refer to user-associated devices or stations (STAs), for example, consistent with the terms "user" and "multi-user" typically used in the context of a multi-user multiple-input and multiple-output (MU-MIMO) environment.

Although examples of communications systems described above may include devices and APs operating according to an 802.11 standard, it should be understood that embodiments of the systems and methods described can operate according to other standards and use wireless communications devices other than devices configured as devices and APs. For example, multiple-unit communication interfaces associated with cellular networks, satellite communications, vehicle communication networks, and other non-802.11 wireless networks can utilize the systems and methods described herein to achieve improved overall capacity and/or link quality without departing from the scope of the systems and methods described herein.

It should be noted that certain passages of this disclosure may reference terms such as "first" and "second" in connection with devices, mode of operation, transmit chains, antennas, etc., for purposes of identifying or differentiating one from another or from others. These terms are not intended to merely relate entities (e.g., a first device and a second device) temporally or according to a sequence, although in some cases, these entities may include such a relationship. Nor do these terms limit the number of possible entities (e.g., devices) that may operate within a system or environment.

It should be understood that the systems described above may provide multiple ones of any or each of those components and these components may be provided on either a standalone machine or, in some embodiments, on multiple machines in a distributed system. In addition, the systems and methods described above may be provided as one or more computer-readable programs or executable instructions embodied on or in one or more articles of manufacture. The article of manufacture may be a floppy disk, a hard disk, a CD-ROM, a flash memory card, a PROM, a RAM, a ROM, or a magnetic tape. In general, the computer-readable programs may be implemented in any programming language, such as LISP, PERL, C, C++, C#, PROLOG, or in any byte code language such as JAVA. The software programs or executable instructions may be stored on or in one or more articles of manufacture as object code.

While the foregoing written description of the methods and systems enables one of ordinary skill to make and use what is considered presently to be the best mode thereof, those of ordinary skill will understand and appreciate the existence of variations, combinations, and equivalents of the specific embodiment, method, and examples herein. The present methods and systems should therefore not be limited by the above described embodiments, methods, and examples, but by all embodiments and methods within the scope and spirit of the disclosure.

What is claimed:

1. A method for automatic provisioning of remote control capabilities to a computing device, comprising:
    detecting, by a first computing device connected to a network, connection of a second computing device to the network;
    responsive to detecting connection of the second computing device to the network, providing, by the first computing device to the second computing device, executable code of a user interface for remote control of one or more additional devices connected to the network, receipt of the executable code causing the second computing device to display the user interface via a browser application of the second computing device;
    receiving, by the first computing device from the second computing device, a remote control command directed to an additional device, the remote control command sent by the second computing responsive to detection by the browser application of an interaction with a control of the user interface; and
    redirecting, by the first computing device to the additional device, the remote control command.

2. The method of claim 1, wherein the remote control command further comprises an identification of the additional device and an identification of a command; and wherein redirecting the remote control command further comprises:
    selecting, by the first computing device, a communication method corresponding to the identified additional device; and
    transmitting a corresponding command, by the first computing device via the selected communication method.

3. The method of claim 2, wherein the communication method comprises a Bluetooth communication protocol; and wherein the identified additional device is paired to the first computing device and not paired to the second computing device.

4. The method of claim 1, further comprising providing, by the first computing device via a display device, a visual identifier of a configuration of the network, the visual identifier captured by a camera of the second computing device and utilized by the second computing device to connect to the network.

5. The method of claim 1, wherein detecting connection of the second computing device to the network further comprises:
    monitoring, by the first computing device, a wireless communications channel for a predetermined time period, responsive to providing the visual identifier; and
    detecting, by the first computing device prior to expiration of the predetermined time period, an identifier broadcast by the second computing device via the wireless communications channel responsive to connection of the second computing device to the network.

6. The method of claim 5, wherein access to the wireless communications channel is provided to the first computing device and the second computing device via a wireless access point.

7. The method of claim 1, wherein detecting connection of the second computing device to the network further comprises:
    receiving, by the first computing device from the second computing device, a request to access a predetermined network address, the request transmitted by the second computing device responsive to connection of the second computing device to the network; and
    providing, by the first computing device to the second computing device, the executable code of the user interface responsive to the request.

8. The method of claim 7, wherein the first computing device comprises a wireless access point.

9. The method of claim 7, wherein receiving the request transmitted by the second computing device responsive to connection of the second computing device to the network further comprises:
receiving the request, by the first computing device, from a third computing device comprising a wireless access point, the third computing device receiving the transmitted request from the second computing device and redirecting the request to the first computing device.

10. The method of claim 1, wherein the second computing device is prevented from directly communicating with the one or more additional devices.

11. The method of claim 1, wherein the executable code of the user interface is associated with a time period; and wherein the method further comprises discarding a remote control command received from the second computing device, by the first computing device, responsive to expiration of the time period.

12. The method of claim 1, further comprising:
prior to providing the executable code of the user interface for remote control of the one or more additional devices connected to the network to the second computing device:
providing, via a second user interface executed by the first computing device or a third computing device, an identification of the second computing device, and
receiving, via the second user interface, a selection of an additional device of the one or more additional devices; and
wherein providing the executable code of the user interface for remote control to the second computing device further comprises providing the executable code of the user interface for remote control of the selected additional device to the second computing device.

13. The method of claim 12, wherein the second computing device is prevented from communicating with additional devices of the one or more additional devices other than the selected additional device.

14. The method of claim 12, wherein the second user interface is configured to display indicators of the one or more additional devices and the second computing device, and detect selection of an additional device via a gesture extending between the indicator of the second computing device and the indicator of the selected additional device.

15. A method for gesture-based network configuration, comprising:
detecting, by a first device connected to a network, connection of a second device to the network;
displaying, via a user interface executed by the first device responsive to the detection of the connection of the second device, an indicator of the second device and indicators of one or more additional devices connected to the network;
detecting, by the first device via the user interface, a gesture extending between the indicator of the second device and the indicator of a first additional device;
configuring, by the first device responsive to detection of the gesture, a network switch of the network to allow communications between the second device and the first additional device; and
configuring the network switch to prevent communications between the second device and any additional device other than the first additional device, responsive to detection of the gesture.

16. The method of claim 15, wherein configuring the network switch further comprises assigning a network address of the second device to a first virtual network and generating a communication policy allowing communications between the first virtual network and a second virtual network including the first additional device and disallowing communications between the first virtual network and one or more additional virtual networks including a corresponding one or more additional devices.

17. The method of claim 15, wherein detecting connection of the second device comprises receiving a notification from a third device comprising a wireless access point providing access to the network, the notification sent responsive to connection of the second device to the network.

18. A system for automatic provisioning of remote control capabilities to a computing device, comprising:
a first computing device comprising a network interface in communication with a network and a processor configured to:
detect connection of the second computing device to the network, and
responsive to detecting connection of the second computing device to the network, provide, via the network interface to the second computing device, executable code of a user interface for remote control of one or more additional devices connected to the network, receipt of the executable code causing the second computing device to display the user interface via a browser application of the second computing device,
receive, from the second computing device via the network interface, a remote control command directed to an additional device, the remote control command sent by the second computing responsive to detection by the browser application of an interaction with a control of the user interface, and
redirect, to the additional device, the remote control command.

19. The system of claim 18, wherein the remote control command further comprises an identification of the additional device and an identification of a command, and wherein the processor is further configured to:
select a communication method corresponding to the identified additional device; and
transmit a corresponding command via the selected communication method.

20. The system of claim 19, wherein the communication method comprises a Bluetooth communication protocol; and wherein the identified additional device is paired to the first computing device and not paired to the second computing device.

* * * * *